(12) United States Patent
Perreault et al.

(10) Patent No.: US 12,051,980 B2
(45) Date of Patent: Jul. 30, 2024

(54) VARIABLE INVERTER/RECTIFIER/TRANSFORMER

(71) Applicant: Massachusetts Institute of Technology, Cambridge, MA (US)

(72) Inventors: David J. Perreault, Cambridge, MA (US); Mike Kavian Ranjram, Tempe, AZ (US); Intae Moon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/339,551

(22) Filed: Jun. 22, 2023

(65) Prior Publication Data

US 2023/0421069 A1 Dec. 28, 2023

Related U.S. Application Data

(63) Continuation of application No. 16/312,071, filed as application No. PCT/US2018/020658 on Mar. 2, 2018, now Pat. No. 11,716,030.
(Continued)

(51) Int. Cl.
*H02M 3/335* (2006.01)
*H01F 27/28* (2006.01)
*H01F 27/38* (2006.01)

(52) U.S. Cl.
CPC .... *H02M 3/33584* (2013.01); *H01F 27/2804* (2013.01); *H01F 27/38* (2013.01); *H01F 2027/2819* (2013.01)

(58) Field of Classification Search
CPC .......................... H01F 27/38; H01F 2027/2819
See application file for complete search history.

(56) References Cited

U.S. PATENT DOCUMENTS 10,244,650 B2 * 3/2019 Laneryd .................. H01F 27/14
10,269,484 B2   4/2019 Jin et al.
(Continued)

FOREIGN PATENT DOCUMENTS

WO   WO 90/13939   11/1990

OTHER PUBLICATIONS

International Preliminary Report on Patentability dated Sep. 12, 2019, for PCT Application No. PCT/US2018/020658; 15 pages.
(Continued)

*Primary Examiner* — Kyle J Moody
(74) *Attorney, Agent, or Firm* — DALY, CROWLEY, MOFFORD & DURKEE, LLP

(57) ABSTRACT

Described is a hybrid electronic and magnetic structure that enables a transformer with fractional and reconfigurable effective turns ratios (e.g. 12:0.5, 12:2/3, 12:1, and 12:2) and hereinafter referred to as a Variable-Inverter-Rectifier-Transformer (VIRT). A VIRT is valuable in converters having wide operating voltage ranges and high step-up/down, as it offers a means to reduce turns count and copper loss within a transformer while facilitating voltage doubling and quadrupling. Such characteristics are beneficial for reducing the size of a transformer stage in many power electronics applications, such as USB wall chargers. In embodiments, a VIRT comprises a plurality of switching cells distributed around a magnetic core and coupled to half-turns wound through that core. By controlling operating modes of the switching cells, it is possible to gain control over flux paths and current paths in the transformer.

13 Claims, 22 Drawing Sheets

Related U.S. Application Data

(60) Provisional application No. 62/466,142, filed on Mar. 2, 2017.

(56) References Cited

U.S. PATENT DOCUMENTS

| | | | |
|---|---|---|---|
| 11,716,030 | B2 | 8/2023 | Perreault et al. |
| 2009/0290385 | A1 | 11/2009 | Jungreis et al. |
| 2011/0006604 | A1 | 1/2011 | Chang et al. |
| 2011/0032732 | A1 | 2/2011 | Hsu |
| 2014/0022826 | A1 | 1/2014 | He et al. |
| 2016/0139651 | A1 | 5/2016 | Schramm et al. |
| 2016/0190943 | A1 | 6/2016 | Chen et al. |

OTHER PUBLICATIONS

Dixon; "How to Design a Transformer with Fractional Turns;" Unitrode/TI Magnetics Design Handbook, No. Topic R6; TI Literature No. SLUP132; Jan. 2000; 9 pages.

Perica; "Elimination of Leakage Effects Related to the Use of Windings with Fractions of Turns;" IEEE Transactions on Power Electronics; vol. PE-1; No. 1; Jan. 1986; 9 pages.

Zhou, et al.; "Applications of Half-Turn on E-Core in Switching Power Supplies;" Applied Power Electronics Conference and Expositions; 1999; APEC '99; Fourteenth Annual; vol. 2; Mar. 1999; 6 pages.

PCT Search Report of the ISA for PCT Appl. No. PCT/US2018/20658 dated May 21, 2018; 3 pages.

PCT Written Opinion of the ISA for PCT Appl. No. PCT/US2018/20658 dated May 21, 2018; 13 pages.

Abramson, et al.; "Design and Evaluation of a Reconfigurable Stacked Active Bridge dc/dc Converter for Efficient Wide Load-Range Operation;" 2017 IEEE Applied Power Electronics Conference and Exposition (APEC); Mar. 26-30, 2017; 11 pages.

Advanced Circuits; "PCB Tolerances;" Jan. 2017; [Online]; http://www/4pcb.com/pcb-design-specifications; 3 pages.

Aoki, et al.; "Distributed Active Transformer—A New Power-Combining and Impedance-Transformation Technique;" IEEE Transactions on Microwave Theory and Techniques; vol. 50; No. 1; Jan. 2002; 16 pages.

Aoki, et al.; "Fully Integrated CMOS Power Amplifier Design Using the Distributed Active-Transformer Architecture;" IEEE Journal of Solid-State Circuits; vol. 37; No. 3; Mar. 2002; 13 pages.

Arbabian, et al.; "A 90GHz-Carrier 30 GHZ-Bandwidth Hybrid Switching Transmitter with Integrated Antenna;" IEEE International Solid-State Circuits Conference; Dig. Tech. Papers; Feb. 2010; 3 pages.

Babakhani, et al.; "A Near-Field Modulation Technique Using Antenna Reflector Switching;" IEEE International Solid-State Circuits Conference; Dig. Tech. Papers; Feb. 2008; 3 pages.

Chen, et al.; "Multitrack Power Conversion Architecture;" IEEE Transactions on Power Electronics; vol. 32; No. 1; Jan. 2017; 16 pages.

Dixon; "Designing Planar Magnetics;" Texas Instruments; Tech. Rep. [Online]; http://www.ti.com/download/trng/docs/seminar/Topic4LD.pdf; 23 pages.

"Enhancement-Mode Gallium Nitride Technology;" Efficient Power Conversion Corp.; Tech Rep; TB001; [Online]; http://epc-co.com/epc/Portals/0/epc/documents/articles/epc_eagan_fet_product_brief.pdg; 6 pages.

Fusco, et al.; "Direct-Signal Modulation Using a Silicon Microstrip Patch Antenna;" IEEE Transactions on Antennas and Propagation; vol. 47; No. 6; Jun. 1999; 4 pages.

Gu, et al.; "Universal Line Input Power Factor Preregulator Using VFX Technique;" 2017 IEEE Applied Power Electronics Conference Exposition (APEC); Mar. 2017; 6 pages.

Hu, et al.; "A Modified High-Efficiency LLC Converter with Two Transformers for Wide Input-Voltage Range Applications;" IEEE Transactions on Power Electronics; vol. 28; No. 4; Apr. 2013; 15 pages.

Huang; "Designing an LLC Resonant Half-Bridge Power Converter;" Texas Instruments Power Supply Design Seminar; SEM1900; No. TI Literature No. SLUP263; Jan. 2010; 27 pages.

Inam, et al.; "Variable Frequency Multiplier Technique for High-Efficiency Conversion Over a Wide Operating Range;" IEEE Journal of Emerging and Selected Topics in Power Electronics; vol. 4; No. 2; Jun. 2016; 9 pages.

Ke, et al.; "Implementation of a Multi-Beam Switched Parasitic Antenna for Wireless Applications;" IEEE Int. Symp. on Antennas and Propagation; Jun. 2007; 4 pages.

Kim, et al.; "Analysis and Design of Boost-LLC Converter for High Power Density AC-DC Adapter;" 2013 IEEE EXXE Asia Downunder; Jun. 2013; 6 pages.

Kim, et al.; "High-Efficiency Single-Stage LLC Resonant Converter for Wide-Input-Voltage Range;" IEEE Transactions on Power Electronics; vol. 33; No. 9; Sep. 2018; 9 pages.

Kim, et al.; "LLC Resonant Converter with Adaptive Link-Voltage Variation for a High-Power-Density Adapter;" IEEE Transactions on Power Electronics; vol. 25; No. 9; Sep. 2010; 5 pages.

Laithwaite, et al.; "Magnetic Equivalent Circuits for Electrical Machines;" Proceedings of the Institution of Electrical Engineers; vol. 114; No. 11; Nov. 1967; 5 pages.

Lee, et al.; "Three-Switch LLC Resonant Converter for High Efficiency Adapter with Universal Input Voltage;" 2017 IEEE 3rd International Future Energy Electronics Conference and ECCE Asia; Jun. 2017; 6 pages.

Li, et al.; "A Novel AC-to-DC Adaptor with Ultra-High Power Density and Efficiency;" 2016 IEEE Applied Power Electronics Conference and Exposition (APEC); Mar. 2016; 8 pages.

Lim, et al.; "Capacitively-Aided Switching Technique for High-Frequency Isolated Bus Converters;" 2016 IEEE Applied Power Electronics Conference and Exposition (APEC) Jan. 2016; 8 pages.

Ouyang, et al.; "Overview of Planar Magnetic Technology—Fundamental Properties;" IEEE Transactions on Power Electronics; vol. 29; No. 9; Sep. 2014; 13 pages.

Papastergiou, et al.; "Emulation of Fractional Turns in Push-Pull Topologies;" Twentieth Annual IEEE Applied Power Electronics Conference and Exposition; APEC; 2005; vol. 2; Mar. 2005; 5 pages.

Perreault, et al.; "Opportunities and Challenges in Very High Frequency Power Conversion;" 2009 Twenty-Fourth Annual IEEE Applied Power Electronics Conference and Exposition; Feb. 2009; 14 pages.

Ranjram, et al.; "Variable-Inverter-Rectifier-Transformer: A Hybrid Electronic and Magnetic Structure Enabling Adjustable High Step-Down Conversion Ratios;" 2017 IEEE $18^{th}$ Workshop on Control and Modeling for Power Electronics (COMPEL); Jul. 2017; 8 pages.

Shin-Young, et al.; "Two-Stage Configuration for 60W Universal-Line AC-DC Adapter;" IECON 2012; $38^{th}$ Annual Conference on IEEE Industrial Electronics Society; Oct. 2012; 6 pages.

Slama; "Building Switching Power Transformers;" APEC 2013 Professional Education Seminars; Session 3; Long Beach, CA; Mar. 18, 2013; 160 pages.

Tarzwell, et al.; "High Voltage Printed Circuit Design & Manufacturing Notebook;" Sierra Proto Express; 2004 [Online]; http://www.magazines007.com/pdf/High-Voltage-PCDesign. pdf; 36 pages.

Texas Instruments Data Sheet PMP7389: UCC28610, UCC24610 and TPS2511 Dual Output Universal USB Charger and Related Documents; http://www.ti.com/tool/PMP7389#TechnicalDocuments; Mar. 21, 2012; 14 pages.

Texas Instruments Data Sheet LM5113 80-V, 1.2-A, 5-A, Half Bridge GaN Driver (NRND); Jan. 2018; 27 pages.

Texas Instruments Application report; "Using UCD7138 and UCD3138A for Advanced Synchronous Rectification Control;" SLUA737B; Mar. 2015; 22 pages.

"Universal Serial Bus Power Delivery Specification;" Hewlett-Packard Company, Intel Corp., Microsoft Corp., Renesas, STMicroelectronics; USB Power Delivery Specification Revision 2.0; Version 1.3; Jan. 12, 2017; 547 pages.

Venkatachalam, et al.; Accurate Prediction of Ferrite Core Loss with Nonsinusoidal Waveforms Using Only Steinmetz Parameters; IEEE Workshop on Computers in Power Electronics; Jun. 2002; 7 pages.

(56) References Cited

OTHER PUBLICATIONS

Zhang, et al.; "Leakage Inductance Calculation for Planar Transformers with a Magnetic Shunt;" IEEE Transactions on Industry Applications; vol. 50; No. 6; Nov./Dec. 2014; 6 pages.

Zhang, et al.; "Design and Analysis of Thermal Management for High-Power-Density Converters in Sealed Enclosures;" Proceedings of APEC 97—Applied Power Electronics Conference; Jan. 1997; 8 pages.

Zhang et al; "A Current-Driving Synchronous Rectifier for an LLC Resonant Converter with Voltage-Doubler Rectifier Structure;" IEEE Transactions on Power Electronics; vol. 27; No. 4; Apr. 2012; 11 pages.

Non-Final U.S. Office Action dated Jun. 20, 2019, for U.S. Appl. No. 16/312,071; 20 pages.

Non-Final U.S. Office Action dated Aug. 7, 2020, for U.S. Appl. No. 16/312,071; 16 pages.

Final U.S. Office Action dated Feb. 4, 2021, for U.S. Appl. No. 16/312,071; 20 pages.

Final U.S. Office Action dated Dec. 2, 2019, for U.S. Appl. No. 16/312,071; 18 pages.

Notice of Allowance dated Mar. 15, 2023, for U.S. Appl. No. 16/312,071; 9 pages.

Response to Non-Final U.S. Office Action dated Jun. 20, 2019, for U.S. Appl. No. 16/312,071; Response filed Sep. 6, 2019; 14 pages.

Appeal Brief for U.S. Appl. No. 16/312,071, filed Apr. 29, 2020; 19 pages.

Response to Non-Final U.S. Office Action dated Aug. 7, 2020, for U.S. Appl. No. 16/312,071; Response filed Nov. 5, 2020; 15 pages.

Appeal Brief for U.S. Appl. No. 16/312,071, filed Jun. 29, 2021; 27 pages.

Decision on Appeal dated Dec. 21, 2022, for U.S. Appl. No. 16/312,071; 7 pages.

Examiner's Answer dated Sep. 17, 2021, for U.S. Appl. No. 16/312,071; 7 pages.

Reply Brief for U.S. Appl. No. 16/312,071, filed Nov. 16, 2021; 4 pages.

\* cited by examiner (a)

(b)

(c)

Layer 1

Layer 2

Layer 3

Layer 4

VARIABLE INVERTER/RECTIFIER/TRANSFORMER

CROSS-REFERENCE TO RELATED APPLICATIONS

This application is a continuation U.S. patent application Ser. No. 16/312,071 filed on Dec. 20, 2018, which is a U.S. National Stage of PCT application no. PCT/US2018/020658 filed in the English language on Mar. 2, 2018, and entitled "VARIABLE INVERTER-RECTIFIER-TRANSFORMER," which claims the benefit under 35 U.S.C. § 119 of provisional application No. 62/466,142 filed Mar. 2, 2017, which applications are hereby incorporated herein by reference in their entireties.

FIELD

The concepts, systems, circuits, devices and techniques described herein relate generally to power converter circuits and more particularly, to the use of magnetic circuit structures (e.g. transformer or coupled inductor structures), inverter, rectifier and cycloconverter structures and associated control techniques for use in power converter circuits. The concepts, systems, devices circuits and techniques described herein improve the efficiency and size of power electronic converters that employ transformers, including grid-interfaced chargers, isolated dc-dc converters, grid-interfaced inverters such as for photovoltaics, dc-ac converters such as for uninterruptible power supplies, and ac/ac converters such as for solid-state transformers.

BACKGROUND

As is known in the art, advancements in switch technologies, such as the introduction of Gallium Nitride (GaN) field effect transistors (FETs), have led to tremendous gains in the size reduction and performance of active switches used in power electronic converters. Advances in the design of passive components, however, have lagged.

In many cases, passive components dominate the size and performance of power electronic converters and therefore present a major bottleneck to size reduction (i.e. "miniaturization") of such converters. While both capacitive and inductive elements limit miniaturization, power-stage magnetic components (i.e. those inductors and transformers that are fundamental to the power transfer mechanism of the converter) present an important limitation on achievable size and efficiency.

Many power electronic converters rely on transformers to satisfy isolation safety requirements and to achieve the bulk of their voltage conversion ratio. For example, wall chargers for conventional USB-powered portable devices must interface at their input to the ac grid (up to 375 V peak voltage in regions employing a 240 Vac grid) and must step-down to as low as 5 Vdc at their output, corresponding to a 75:1 voltage conversion ratio. To achieve such step-down, it is typical to employ a transformer having a large turns ratio (e.g. a turns ratio on the order of 22:1). This demanding specification aggravates the volume and efficiency limitations of the transformer for two key reasons.

First, in applications where the transformer processes low voltages and high currents at one of its ports (as in the output of many converters), it is likely that the copper loss of the transformer far outweighs the core loss, and this imbalance compromises the efficiency of the transformer. For a given transformer conversion ratio (e.g. 22:1), the choice of the number of primary and secondary turns used to implement this ratio provides a means to re-balance core and copper loss inside the transformer to minimize total loss. Specifically, as the number of turns is scaled down, copper loss is reduced at the cost of increased core loss. In applications with low voltages and high currents, this is the desired trade-off. However, this trade-off is fundamentally limited since fractional turns cannot be employed in a conventional transformer. If the transformer losses are not reduced (and ideally, minimized) after scaling down to a single-turn on either of the windings, one must either accept the reduced efficiency of the transformer or find another means to optimize loss (typically by increasing the size and window area of the transformer core).

A second limitation of transformers requiring large turns ratios is that placing a high number of turns on a core can in itself be problematic or unfeasible. This is particularly important when planar transformers, which offer tremendous potential for improved fabrication and miniaturization, are employed. In a planar transformer, windings are routed (e.g. etched or otherwise provided) as conductive traces on a printed circuit board (PCB), and these traces must adhere to the trace width and spacing fabrication requirements of the PCB manufacturing process. Thus, in addition to meeting current and voltage requirements, the width of each trace width as well as the edge-to-edge spacing between traces must be selected to meet the PCB fabrication requirements.

FIG. 1 provides an illustration of this penalty, where traces in a twelve (12) turn transformer 5 have less than one-third of the width of a six (6) turn transformer 8. It should be noted that in the limit where no trace-spacing requirements exist, the windings would have half the width. Not only does this increase the resistance and copper loss of the transformer, it creates the possibility that a given number of turns cannot be accommodated at all if they require trace widths smaller than can be fabricated on the board (i.e. not only does this manufacturing constraint increase the resistance and copper loss of the transformer, it creates the possibility that a required number of turns cannot be accommodated at all in a given core window width). It will also be appreciated that with limited numbers of turns and the need to use integer numbers of turns in traditional designs, the achievable resolution in achievable turns ratios may often limit how close to a desired ratio is realized.

One attractive means to mitigate these limitations is to use a transformer providing "fractional" turns in realizing the turns ratio (e.g. 1:0.5). Such a transformer enables reduced turns counts in planar magnetics where window breadth is at a premium while also offering the preferred trade-off between copper loss and core loss in applications with low output voltages and high output currents. One concept for a "fractional" turns transformer in power electronics was first introduced in the mid-1980s in the context of multichannel power supplies, with initial focus on its ability to fine-tune the turns ratio of unregulated transformer outputs (see G. Perica, "Elimination of leakage effects related to the use of windings with fractions of turns," IEEE Transactions on Power Electronics, vol. PE-1, no. 1, pp. 39-47, January 1986 and L. H. Dixon, "How to design a transformer with fractional turns," in Unitrode/TI Magnetics Design Handbook, no. Topic R6, TI Literature Number: SLUP132, 2000). One key idea in these transformers is to wind a complete turn-around a section of the transformer core that only carries a fraction of the primary-generated flux.

FIGS. 2A-2C illustrate three prior art techniques for achieving a transformer having a "fractional" turns ratio.

FIG. 2A, illustrates a prior art transformer having a fractional turns ratio provided by having a single-turn secondary wound around a core-leg that carries only half of the primary-generated flux. Thus, in this embodiment a ratio of primary voltage Vp to secondary voltage Vs corresponding to 1:0.5 (i.e. Vp:Vs=1:0.5) is achieved.

FIG. 2B, illustrates an alternate embodiment of a prior art transformer having a fractional turns ratio provided by connecting two outer leg windings in parallel such that a secondary voltage Vs is induced by only half the primary-generated flux. Thus, in this embodiment a ratio of primary voltage Vp to secondary voltage Vs corresponding to 1:0.5 (i.e. Vp:Vs=1:0.5) is achieved.

FIG. 2C illustrates another alternate embodiment of a prior art transformer 10" having a fractional turns ratio by utilizing two half turns 18a, 18b to achieve the same voltage coupling effect as in the transformer embodiment of FIG. 2B. In the embodiment of FIG. 2C, it is assumed that there exists a means to parallel the half-turns. Such means may be provided, for example, as proposed in the above noted L. H. Dixon, "How to design a transformer with fractional turns"). In this embodiment, the wires could be arranged in a direction perpendicular to the surface of FIG. 2C (i.e. brought "out of the page") and connected above the core (indicated by the dotted lines). These out-of-plane connections complete turns on sections of the transformer core, and impose additional conduction length on the secondary, greatly reducing the "half-turns" benefit in terms of conduction loss.

Referring briefly to FIG. 2A, consider winding a single turn primary around the center-post of a conventional three-legged core and a single turn secondary around one of the outer legs. By symmetry of the core, half of the primary-generated flux enters each outer core leg. Thus, by Faraday's law, the voltage coupled onto the single-turn secondary is one half the voltage applied to the primary, thereby creating an effective 1:0.5 transformer ratio (i.e. a "half turn" transformer).

However, by extracting a "half turn" in this way, half of the primary generated flux does not link to the secondary and instead circulates through the relatively low reluctance of the unused core leg, resulting in a leakage inductance on the order of the transformer's magnetizing inductance. Permutations of this idea have been proposed, including using more complicated core shapes to further reduce the effective "turn fraction" of the secondary and developing special windings to cancel out the unwanted circulating flux.

For example, and with reference now to FIG. 2B, a simple solution to the circulating flux problem is shown in FIG. 2B. Here, a single turn is wound around both outer legs of the three-legged core and then these windings are connected in parallel. In this configuration, half of the primary-generated flux is linked into each secondary winding, removing the "leakage" path of FIG. 2A. However, since these windings are connected in parallel, the secondary voltage Vs is still only induced by half of the primary-generated flux, thus the voltage conversion ratio remains Vp:Vs=1:0.5.

An equivalent representation of the winding scheme in FIG. 2B is shown in FIG. 2C. This technique is proposed as means to further reduce the leakage inductance of the secondary. Here, two "half turns" achieve the same voltage coupling effect and improve on FIG. 2B as long as there is a means to parallel the voltages without going around the outer perimeter of the core. In a non-planar transformer, the wires can be brought "out of the page" and connected above the core, completing the turns around the core. However, such a structure cannot be exploited as-is in a planar configuration.

It is important to note that all of the above "fractional turns" design concepts, the amount of fluxed linked by windings is "fractionalized," but ac currents still appear around full loops of conductors around core sections, imposing associated conduction losses in the windings, so the turns are not "fractional" as regards conduction loss.

"Emulation" of fractional turns has also been proposed for push-pull topologies, where integer-and-a-half turns ratios (e.g. 1:1.5) can be implemented via a center-tap transformer with an unequal number of secondary turns. While this configuration may be attractive for achieving precise voltage conversion ratios, it is not suitable for miniaturization at high conversion ratios as it does not enable transformer ratios less than 1:1 (e.g. it cannot exploit a ratio having a half turn as one of the windings) and it requires a center-tapped transformer, which can be problematic for achieving good current-handling capability if planar magnetics are used.

SUMMARY

It would, therefore, be desirable to provide a transformer having the true ability to provide fractional turns since such a transformer would offer strong benefits for achieving miniaturization in applications that benefit from fractional turns, such as with high step-up/down ratios.

Accordingly, described is a hybrid electronic and magnetic structure that realizes a transformer with a fractional and reconfigurable effective turns ratio. Unlike previous "fractional" turn designs, the technique described in some embodiments herein yields ac currents flowing in only fractions of a complete turn prior to rectification, enabling reduced conduction loss as compared to previous concepts. In other embodiments, described herein for some operating modes of the hybrid electronic and magnetic structure it is possible for ac currents to flow outside a magnetic core, providing a trade-off for achieving increased gain in those modes. Moreover, the proposed concepts, systems, circuits, devices and techniques enable dynamic electronic reconfigurability of the effective transformation ratio, providing added degrees of flexibility. Together, these qualities enable miniaturization of a transformer stage in converters where variable high step-up/down ratios are required. The proposed structure is referred to herein as a "Variable-Inverter-Rectifier-Transformer" (VIRT), named this way because it fundamentally connects the rectifier stage (or inverter, or both) of a converter to the magnetic structure of the transformer and through this hybridization enables variable conversion ratios, fractional effective turns, and reduced conduction loss.

The described concepts, systems, circuits, devices and techniques realize transformers with fractional and reconfigurable voltage conversion ratios, enabling transformers that can reap the benefit of fractional turns (which to date has been an unexploited benefit for a variety of reasons preventing the manufacture of practical circuits) while simultaneously making transformers better suited to accommodate wide operating ranges. Together, these characteristics offer substantial improvement to the transformer stage in many converters, and the concepts, systems, circuits, devices and techniques described herein, therefore, offers tremendous potential for higher-performance and miniaturized power electronic converters.

Embodiments of the broad concepts described herein provide a functionality which is valuable in converters with wide operating voltage ranges and high step-up/down, as it offers a means to reduce the turns count and copper loss within the transformer while also facilitating voltage doubling and quadrupling. These properties are especially beneficial for miniaturizing transformer stages in many power electronics applications, such as USB wall chargers. Some embodiments of VIRT described may comprise four half-bridge switching cells distributed around a planar magnetic core and coupled to two "half-turns" wound through that core. By controlling the operating modes of the half-bridge cells, control over the flux paths and current paths used in the transformer, is gained and this hybridization enables fractional and reconfigurable effective turns ratios.

In one embodiment, a VIRT comprises a transformer having a magnetic core and a set of fractional turns. The VIRT may further comprise sets of switching cells coupled to fractional turns of a conductor forming a secondary winding on a magnetic core, wherein the a first set of switching cells operates in a first operating mode and a second set of switching cells operates in a second operating mode. The effective turns ratio of the transformer may be based upon the operating modes of the first and second switching cells. The operating modes of the first and second cells may or may not be the same. The set of fractional turns may likewise include a non-integer set of turns, including a non-integer turn count that is greater than 1 (e.g., 1.5 turn sections).

It should be appreciated that two switching cells are sometimes referred to herein a "power converter." This should, of course, be distinguished from use of the term power converter to refer to the entire system together which does indeed form a power converter (e.g. a completer power converter).

The VIRT may further include one or more of the following features taken either alone or in combination: wherein a first set of switching cells is coupled to a secondary side of the magnetic core by a half-turn and a second set of switching cells is coupled to the secondary side of the magnetic core by a half-turn; wherein a first cell of the first set of switching cells and a first cell of the second set of switching cells are located on opposite ends of the secondary side (e.g. B1 and A1 in FIG. 3); wherein a second cell of the first set of switching cells and a second cell of the second set of switching cells power are located on opposite ends of the secondary side; wherein the first set of switching cells is further coupled to an output of the transformer and wherein the second of switching cells is further coupled to the output of the transformer. In embodiments the switching cells may be provide as any of half-bridge switching cells, multi-level switching cells (e.g. multilevel converters), single-transistor switching cells (such as class E switching cells), current and voltage multiplying switching cells, etc. It should be appreciated that selection of a particular switching cell structure to use is dependent upon the needs and requirements of a particular application. In some embodiments, the operating modes of the sets switching cells may be symmetrical while in other embodiments the operating modes of the sets switching cells may not be symmetrical. In embodiments in which the sets of switching cells as considered as power converters, the power converters may comprise at least one of a rectifier or inverter or cycloconverter.

In one embodiment, a VIRT comprises a transformer comprising a magnetic core and having a turns ratio. The VIRT may further include first and second power converters coupled to a secondary side of the magnetic core, wherein the first power converter operates in a first converter operating mode and the second power converter operates in a second converter operating mode and the turns ratio of the transformer may be based upon the first converter operating mode and the second converter operating mode.

The VIRT may further include one or more of the following features taken either alone or in combination: wherein the first power converter is coupled to the secondary side of the magnetic core by at least a half-turn winding and wherein the second power converter is coupled to the secondary side of the magnetic core by a like winding; wherein the first power converter is coupled to the secondary side of the magnetic core by a winding comprising a non-integer set of turns and wherein the second power converter is coupled to the secondary side of the magnetic core by a like winding; wherein the first power converter comprises a first switching cell and a second switching cell and wherein the second power converter comprises a first switching cell and a second switching cell; wherein the first cell of the first power converter and the first cell of the second power converter are disposed at a first end of the secondary side of the magnetic core; wherein the second cell of the first power converter and the second cell of the second power converter are disposed at a second, opposite, end of the secondary of the magnetic core; wherein the first and second cells of the first power converter are disposed proximate to a first half-turn winding and the first and second cells of the second power converter are disposed proximate to a like winding; wherein the first and second switching cells of the first power converter and the first and second switching cells of the second power converter each comprise at least one of a multilevel switching cell, half-bridge switching cell, single-transistor switching cell, current multiplying switching cell, or voltage multiplying switching cell; where each of the first and second switching cells of the first power convert and the first and second switching cells of the second power converter operate in a respective switching pattern; wherein the operating mode of the first power converter is based upon the switching pattern of the first and second switching cells of the first power converter; and wherein the operating mode of the second power convertor is based upon the switching pattern of the first and second switching cells of the second power converter.

In another embodiment, a VIRT comprises a transformer having a turns ratio and a magnetic core. Further the VIRT may include a first rectifier coupled to a secondary side of the magnetic core, wherein the first rectifier comprises a first half-bridge cell and a second half-bridge cell and a second rectifier coupled to the secondary side of the magnetic core, wherein the second rectifier comprises a first half-bridge cell and a second half-bridge cell. Additionally, the first rectifier may operate at a first rectifier operating mode, the second rectifier may operate at a second rectifier operating mode, and the turns ratio may be based upon the first rectifier operating mode and the second rectifier operating mode.

The VIRT may further include one or more of the following features taken either alone or in combination: wherein the first rectifier operating mode and the second rectifier operating mode each comprise one of a full-bridge mode, half-bridge mode, or zero mode; wherein the turns ratio of the transformer is 2:1 when the first rectifier is operating in full-bridge mode and the second rectifier is operating in full-bridge mode; wherein the turns ratio of the transformer is 3:2 when the first rectifier is operating in full-bridge mode and the second rectifier is operating in half-bridge mode; wherein the turns ratio of the transformer is 1:1 when the first rectifier is operating in half-bridge mode and the second rectifier is operating in half-bridge mode;

wherein the turns ratio of the transformer is 1:1 when the first rectifier is operating in full-bridge mode and the second rectifier is operating in zero mode; wherein the turns ratio of the transformer is 1:2 when the first rectifier is operating in half-bridge mode and the second rectifier is operating in zero mode; wherein one of the first half-bridge cell or second half-bridge cell of the first rectifier is held in a low state when the first full-bridge rectifier is operating in a half-bridge mode; wherein the first half-bridge cell and second half-bridge cell of the second rectifier are held in a low state when the first full-bridge rectifier is operating in a zero mode; wherein the first half-bridge cell of the first rectifier and the first half-bridge cell of the second rectifier are located at a first end of the secondary side of the magnetic core; wherein the second half-bridge cell of the first rectifier and the second half-bridge cell of the second rectifier are located at a second, opposite end of the secondary side of the magnetic core.

In another embodiment, a method for adjusting a turns ratio of a VIRT comprises: determining a desired turns ratio for a transformer, wherein the transformer comprises a magnetic core and adjusting an operating state of a first rectifier according to the desired turns ratio, wherein the first rectifier is coupled to a secondary side of the magnetic core. Further, the method may include adjusting an operating state of a second rectifier according to the desired turns ratio, wherein the second rectifier is coupled to a secondary side of the magnetic core.

The method may further include one or more of the following features taken either alone or in combination: wherein the first rectifier comprises a first half-bridge rectifier cell and a second half-bridge rectifier cell; wherein adjusting the operating state of the first rectifier comprises adjusting a switching pattern of the first half-bridge rectifier cell and the second half-bridge rectifier cell according to the desired turns ratio; wherein the second rectifier comprises a first half-bridge rectifier cell and a second half-bridge rectifier cell; wherein adjusting the operating state of the second rectifier comprises adjusting a switching pattern of the first half-bridge rectifier cell and the second half-bridge rectifier cell according to the desired turns ratio.

In another embodiment, a VIRT comprises a transformer having a turns ratio, wherein the transformer comprises a magnetic core and a first rectifier coupled to a secondary side of the magnetic core, wherein the first rectifier comprises a first half-bridge cell and a second half-bridge cell. The VIRT may additionally include a second rectifier coupled to the secondary side of the magnetic core, wherein the second rectifier comprises a first half-bridge cell and a second half-bridge cell, a third rectifier coupled to the secondary side of the magnetic core, wherein the third rectifier comprises a first half-bridge cell and a second half-bridge cell, and a fourth rectifier coupled to the secondary side of the magnetic core, wherein the fourth rectifier comprises a first half-bridge cell and a second half-bridge cell. Further, wherein the first rectifier may operate at a first rectifier operating mode and wherein the second rectifier may operate at a second rectifier operating mode. Also, wherein the third rectifier may operate at a third rectifier operating mode; wherein the fourth rectifier may operate at a fourth rectifier operating mode; and wherein the turns ratio is based upon the first rectifier operating mode and the second rectifier operating mode and the third rectifier operating mode and the fourth rectifier operating mode.

The VIRT may further include one or more of the following features taken either alone or in combination: wherein the first rectifier operating mode, the second rectifier operating mode, the third rectifier operating mode, and the fourth rectifier operating mode each comprise one of a full-bridge mode, half-bridge mode, or zero mode; wherein the first half-bridge cell of the first rectifier and the first half-bridge cell of the fourth rectifier are located at a first end of the secondary side of the magnetic core; wherein the second half-bridge cell of the first rectifier and the second half-bridge cell of the fourth rectifier are located at a second, opposite end of the secondary side of the magnetic core; wherein the first half-bridge cell of the second rectifier and the first half-bridge cell of the thirds rectifier are located at a third end of the secondary side of the magnetic core, wherein the third end is adjacent to the first end; wherein the second half-bridge cell of the second rectifier and the second half-bridge cell of the third rectifier are located at a fourth end of the secondary side of the magnetic core, wherein the fourth end is opposite the third end; wherein each the first, second, third, and fourth rectifiers are each coupled to the secondary side of the magnetic core via at least a quarter-turn winding.

In embodiments, a hybrid electronic and magnetic structure, referred to herein as a Variable-Inverter-Rectifier-Transformer (VIRT), that enables a transformer with fractional and reconfigurable effective turns ratios (e.g. 12:0.5, 12:2/3, 12:1, and 12:2) includes a plurality of half-bridge switching cells distributed around a magnetic core and coupled to half-turns wound through that core. By appropriately controlling the operating modes of the half-bridge cells with a controller, it is possible to gain control over the flux paths and current paths used in the transformer.

With this particular arrangement, a variable-inverter-rectifier-transformer (VIRT) having a fractional and reconfigurable effective turns ratios is provided. A VIRT is valuable in a wide variety of applications where for a desired turns ratio a single turn on one side of the transformer results in high conduction losses such that realizing fractional turns on that side of the transformer enables total transformer loss (core loss plus copper loss) to be reduced. This includes applications requiring a high step-up/down (e.g. greater than 20:1). VIRT is also valuable in applications where the desired conversion ratio changes over a wide range (e.g., greater than a 3:1 range)

The VIRT, thus provides a means to reduce the turns count and copper loss within the transformer while also facilitating changes in conversion ratio such as voltage doubling and quadrupling. Such characteristics are especially beneficial for reducing the size of a transformer stage in many power electronics applications, such as USB wall chargers.

In one illustrative embodiment, the VIRT is integrated with a stacked bridge LLC converter to accommodate a widely varying input (120-380 Vdc) and output (5-20 Vdc) and VIRT is shown to be highly beneficial in keeping efficiency high over this wide output voltage range.

Thus, described are concepts, systems, circuits, devices and techniques which address a need to accommodate wide operating ranges in many power electronic converters where a transformer is employed to achieve large voltage conversion ratios. For example, USB PD wall chargers must accommodate universal ac voltage (85-265 $V_{ac}$) at their input, while regulating voltages between 5 and 20 $V_{dc}$ at their output.

BRIEF DESCRIPTION OF THE DRAWINGS

The foregoing features may be more fully understood from the following description of the drawings in which:

FIG. 6B represents loss associated with the path around the core can be modeled by a transferance term $\mathcal{L}$, and FIG. 6C illustrates that in the limit where there is no loss in the path around the core $\mathcal{L} \to \infty$, yielding the ideal magnetic model;

DETAILED DESCRIPTION

Figure 1:
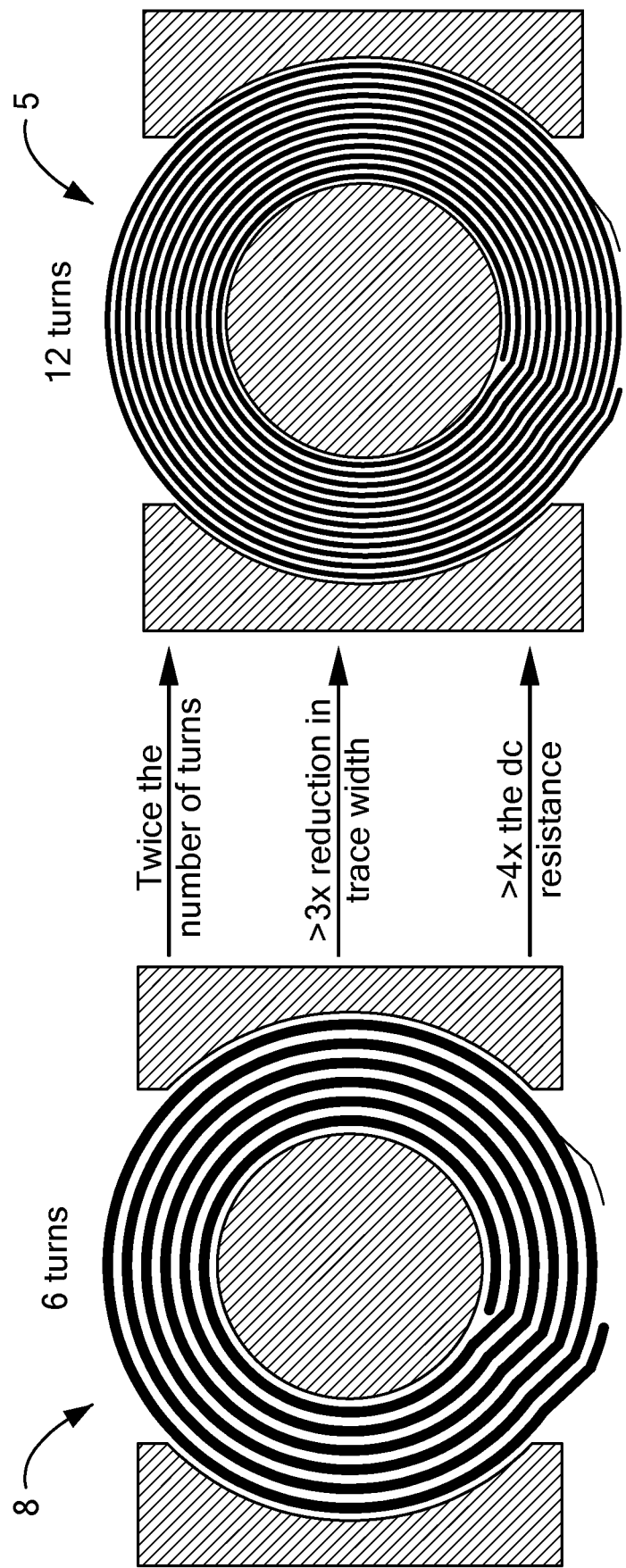
FIG. 1 is a schematic diagram of a prior art system which illustrates the impact of doubling the number of turns wound around a planar magnetic core.

Before proceeding with a detailed description of FIGS. 3-19 below, some introductory concepts are explained. In general overview, described herein are concepts, systems, circuits and techniques directed toward hybrid electronic and magnetic structures generally referred to herein as Variable-Inverter-Rectifier-Transformers (sometimes referred to herein as "VIRT structures" or more simply a "VIRT" or "VIRTs"). In general, the hybrid magnetic/electronic structures and techniques integrate a plurality of rectifiers, inverters, cycloconverters, or any combination thereof into the windings of a transformer to form the VIRT structures.

Such VIRT structures are used to provide transformers having a wide range of fractional and reconfigurable effective turns ratios. For example, fractional and reconfigurable effective turns ratios of 12:1/2, 12:2/3, 12:1, and 12:2 may be achieved. Other fractional and reconfigurable effective turns ratios may, of course, also be achieved via circuits provided in accordance with the concepts described herein.

Thus, the described concepts, systems, circuits, devices and techniques may be used to address a need to accommodate wide operating ranges in many power electronic converters where a transformer is employed to achieve large voltage conversion ratios. For example, USB PD wall chargers must accommodate universal ac voltage (85-265 $V_{ac}$) at their input, while regulating voltages between 5 and 20 $V_{dc}$ at their output.

The described concepts systems, circuits and techniques offer a means to reduce a turns count and copper loss within a transformer while also facilitating realizing adjustable conversion ratios. To reduce turns count and copper loss, VIRT firstly enables fractionalized conversion ratios (e.g. $N_p$:0.5, where $N_p$ is the number of primary turns). Fractional conversion ratios are beneficial when, after reducing a transformer design to a single turn on either side of the transformer, copper loss is high. For example, if an 2Np:1 transformer design has high copper loss, moving to an $N_p$:0.5 design will reduce copper loss while maintaining the same voltage conversion ratio. Copper loss is reduced in this case because half as many turns are wound on the primary. This is a means to reduce turns count and, correspondingly, to reduce copper loss. Second, in the case of VIRT, copper loss is also reduced compared to "fractional turns" concepts in the prior art because ac current only need conduct through the two half-turns (or more generally N fractional 1/N turns) rather than having to conduct in full loops around the core.

The concepts described herein are valuable in a wide variety of applications including, but not limited to, converters having wide input or output operating voltage ranges (e.g. operating voltage ranges on the order of 3:1 or greater). A wide operating voltage range may include an operating voltage range yielding a large loss and/or stress in a candidate topology. For example, a 4:1 output voltage range may be problematic to accommodate in a high step-down flyback converter because of high converter stresses.

Furthermore, the techniques described herein result in circuits, devices and systems having a size and/or loss which is reduced in comparison with prior art circuits—devices and systems having the same or similar operating characteristics and/or design constraints. Thus, in some applications such as power electronics applications, such as Universal Serial Bus (USB) wall chargers, it is possible to achieve a size reduction (e.g. a miniaturization) of transformer stages. Similar advantages can be found in dc-dc converters in a number of different applications including, but not limited to telecommunications, electric and hybrid vehicles, dc distribution systems—to name a few. For example, an electric vehicle may have a large step-down requirement (e.g. 400 to 12) which may result in a transformer design with a single secondary turn that would be further optimized by moving to fractionalized turns. This is a scenario where VIRT is beneficial.

It should also be appreciated that reference is sometimes made herein to embodiments implemented using half-turns and quarter-turns. It should be understood that such references represent only illustrative embodiments and should not be construed as limiting of the broad concepts described herein. It is recognized that alternative implementations are possible, including distributing the copper traces of each fractional turn on a plurality of the layers of a printed circuit board, or using wound wire. It should also be appreciated that the length and width of the fractional turns described herein are controllable and that a half-turn or quarter-turn need not have a length that is precisely one-half or one-quarter of the core window length, respectively. For example, the rectifiers can be placed inside a window of the transformer, shortening the length of each fractional turn.

Also described herein is a principle of operation of the VIRT structure as well as models for magnetic and electrical behavior of the VIRT structure.

Figure 3:
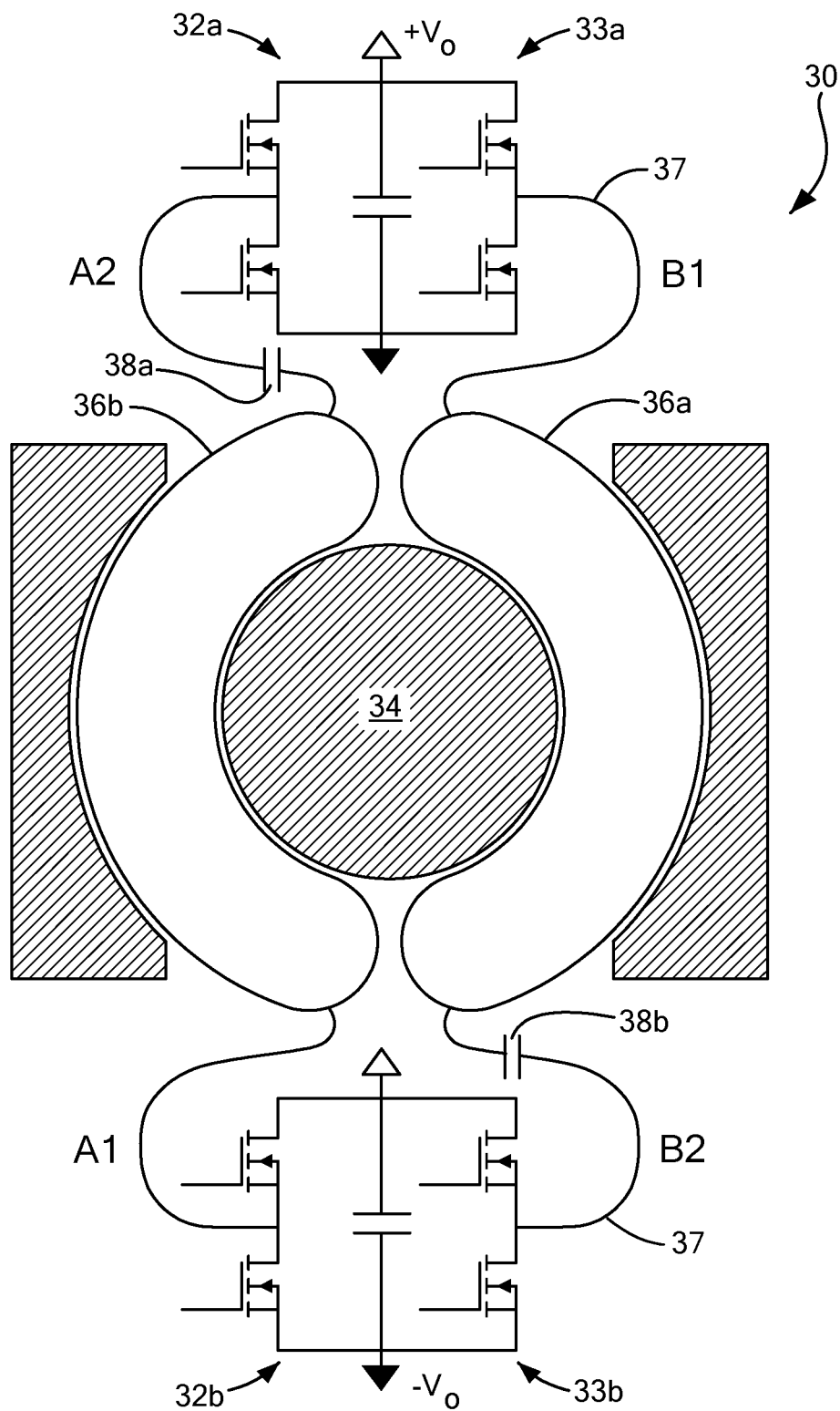
FIG. 3 is a schematic diagram of a variable-inverter-rectifier-transformer (VIRT).

As a case-study for understanding the VIRT structure and technique, portions of this application make reference to an illustrative embodiment of a VIRT shown in FIG. 3. It should, however, be appreciated that that this represents only one instantiation of an embodiment provided in accordance with the broad concepts, systems, circuits and technique described herein. It should also be appreciated that the purpose of focusing on an illustrative embodiment is merely to promote clarity in the description (text and figures) of the broad concepts described herein. It should be noted that variants of the VIRT illustrated in FIG. 3 are also described to further illustrate the broad concepts sough to be protected herein.

Referring now to FIG. 3, in one illustrative embodiment described herein, an instance (i.e.an illustrative example) of a Variable-Inverter-Rectifier-Transformer (VIRT) 30 comprises four half-bridge switching cells 32a, 32, 33a, 33b shown here configured as two variable power convertors (here represented as variable rectifiers 32, 33) distributed around a planar magnetic core 34 each coupled at least one fractional turns of conductor (represented here as "half-turns" 36a, 36b) wound through the core. According to some embodiments, the fractional turns of conductor may include a non-integer set of turns (e.g. 1.5 turns). Each variable power converter may comprise a rectifier, invertor, cycloconverter, or any combination thereof. The cross-hatched areas represent the cross section of the magnetic core on the plane where the traces are routed. Conductive traces 37 represent the secondary-turn. Note that the placement of the rectifiers reflects their physical location relative to the magnetic core. Capacitors 38a, 38b correspond to blocking capacitors. Each variable power converter includes at least one switching cell (here represented as half-bridge switching cells) operating in a switching pattern. For example, a first variable rectifier 32 includes half-bridge switching cells 32a and 32b and a second variable rectifier 33 includes half-bridge switching cells 33a and 33b. Switching cells may include multi-level switching cells (e.g. multilevel converters), single-transistor switching cells (e.g. class E switching cells), current and voltage multiplying switching cells, half-bridge switching cells, or any combination thereof—to name a few examples.

The switching cells of the power converters are disposed symmetrically (i.e. proximate to the half turns in an identical layout) around the magnetic core. For example, half-bridge switching cells 32a, 32b, 33a, and 33b are distributed around a planar magnetic core 34 so that a first half-bridge switching cell of the first rectifier 32 and a first half-bridge switching cell of the second rectifier 33 are located at a first end of magnetic core 34 and a second half-bridge switching cell of the first rectifier 32 and a second half-bridge switching cell of the second rectifier 33 are located at a second, opposite end of magnetic core 34. For example, half-bridge switching cells 32a and 33a are located at a first end of magnetic core 34 and half-bridge switching cells 32b and 33b are located at a second, opposite end of magnetic core 34. Note that the placement of the rectifiers reflects their physical location relative to the magnetic core.

Each variable power converter (such as variable rectifiers 32, 33) is configured to operate in different operating modes according to switching patterns of its respective switching cells (such as half-bridge switching cells 32a,b and 33a,b). For example, variable rectifier A is configured to operate in an operating mode according to the switching pattern of half-bridge switching cells 32a and 32b.

By appropriately controlling the operating modes of the switching cells (e.g. the switching patterns of switching cells such as the half-bridge switching cell of the illustrative embodiment of FIG. 3.) It is possible to gain control over flux paths and current paths used in the transformer. This hybridization enables fractional and reconfigurable effective turns ratios.

It should be appreciated that the "operating modes" of the half-bridge cells are described herein below at a higher level, in terms of the consequences of operating in various modes e.g. FB/FB, HB/HB, HB/0 mode, etc.

In terms of how the cells are explicitly controlled, the following states exist for each half-bridge cell:
 (1) Upper switch on, lower switch off
 (2) Upper switch off, lower switch on
 (3) Both switches off
 (4) Both switches on It should be understood that State 4 is invalid because it yields a short-circuit across the input of the cell.

Various control modes are achievable that use one or more of the available states.

When "switching," the half-bridge cells may follow this state trajectory: 2, 3, 1, 3, 2, 3, 1, 3 . . . (i.e. alternating between the upper switch on and the lower switch on, with State 3 in-between where they are both off—this is a practical requirement to avoid operating in State 4).

The half-bridge cells can also be "bypassed" such that they are held in State 1 or State 2 indefinitely. If bypassed in State 1, the cell will feed the input voltage it its output. If bypassed in State 2, the cell will output zero voltage. They are equivalent from an ac perspective.

In one embodiment, an experimental prototype integrates the VIRT with a stacked bridge LLC converter to accommodate a widely varying input voltage (e.g. an input voltage in the range of 120-380 Vdc) and a widely varying output voltage (e.g. an output voltage in the range of 5-20 Vdc). In this illustrative embodiment, the VIRT is shown to be highly beneficial in keeping efficiency high over such a wide output voltage range.

Two variable rectifiers (which in some embodiments may be full bridge rectifiers) are distributed around a magnetic core 34 and connected through two "half-turns" on the secondary side, i.e. the low voltage side of magnetic core 34. A primary winding (not visible in FIG. 3) comprises an arbitrary number of turns wound around the center-post. The two rectifiers are designated as "A" and "B" in FIG. 3. In this illustrative embodiment, rectifier A (generally denoted 32) comprises first and second half-bridge switching cells (or more simply "cells") designated A1 and A2 and identified with reference numerals 32a, 32b. Similarly, rectifier B (generally denoted 33) comprises first and second half-bridge switching cells designated B1 and B2 and identified with reference numerals 33a, 33b in FIG. 3. In this illustration, each half-bridge cell is directly connected to the output bus through the terminals labelled $+V_o$ and $-V_o$, for example through power and ground planes that are outside the magnetic core. In other embodiments, it may be desirable or even necessary to couple each half-bridge cell to the output bus through the terminals labelled $+V_o$ and $-V_o$, though one or more intervening (or intermediate) circuits or components. For example, the cell could be part of a larger rectifier and therefore might not directly connect to the output bus.

Each rectifier 32, 33 can be independently operated in any of: full-bridge, half-bridge, or "zero" mode. That is, it is possible for each rectifier to be concurrently operated in a different mode (i.e. each rectifier need not be operated in the same mode at the same time).

With respect to full-bridge mode, a variable rectifier switches as a full-bridge rectifier. When a variable rectifier (such as rectifier A, for example), is operated in full-bridge mode then both first and second half-bridge cells A1 and A2 are active (i.e. switching). Because both the first and second half-bridge cells A1 and A2 are both active, half-bridge cells A1 and A2 together switch as a conventional full-bridge rectifier.

According to an embodiment, in full-bridge mode, both switching cells are switch with a phase delay between them. Namely, when one cell is in State 1 the other cell is in State 2. For example, when a power converter is operating in full-bridge mode, a switching pattern for a first switching cell may comprise CELL1: 1, 3, 2, 3, 1, . . . and a switching pattern for a second switching cell may comprise CELL 2: 2, 3, 1, 3, 2, . . . .

With respect to half-bridge mode, a variable rectifier switches as a half-bridge rectifier. When a variable rectifier (such as rectifier A) is operated in half-bridge mode, a first one of the rectifier's switching cells is active and a second one of the rectifier's cells is "held" (i.e. biased via a bias signal such as a voltage signal) in the low or high state (i.e. with its lower switch or upper switch, respectively, kept on (i.e. biased into its conductive state) continuously so that the half-bridge provides a constant potential at the winding and ac current cannot be rectified to the dc output by that half-bridge). For example, if variable rectifier A is operating in a half bride mode then cell A1 may be active and switch as a conventional half-bridge rectifier while cell A2 is "held".

According to some embodiments, the positive current direction in the primary side of the magnetic core defines a dot convention in the transformer that will set up induced currents with a particular polarity on the secondary side of the magnetic core. A person of ordinary skill will appreciate that the choice of which cell to switch and which cell to bypass (and how to bypass that switch) must respect that polarity.

With respect to "zero" mode, a variable rectifier effectively behaves as an ac short. When a variable rectifier (such as rectifier A1) is operated in a "zero" mode, both of the rectifier's switching cells are "held", as discussed above. For example, if rectifier A, is operated in "zero" mode, then both cells A1 and A2 are held in the low (or high) state, providing an effective ac short of that section of the winding.

Figure 4A:
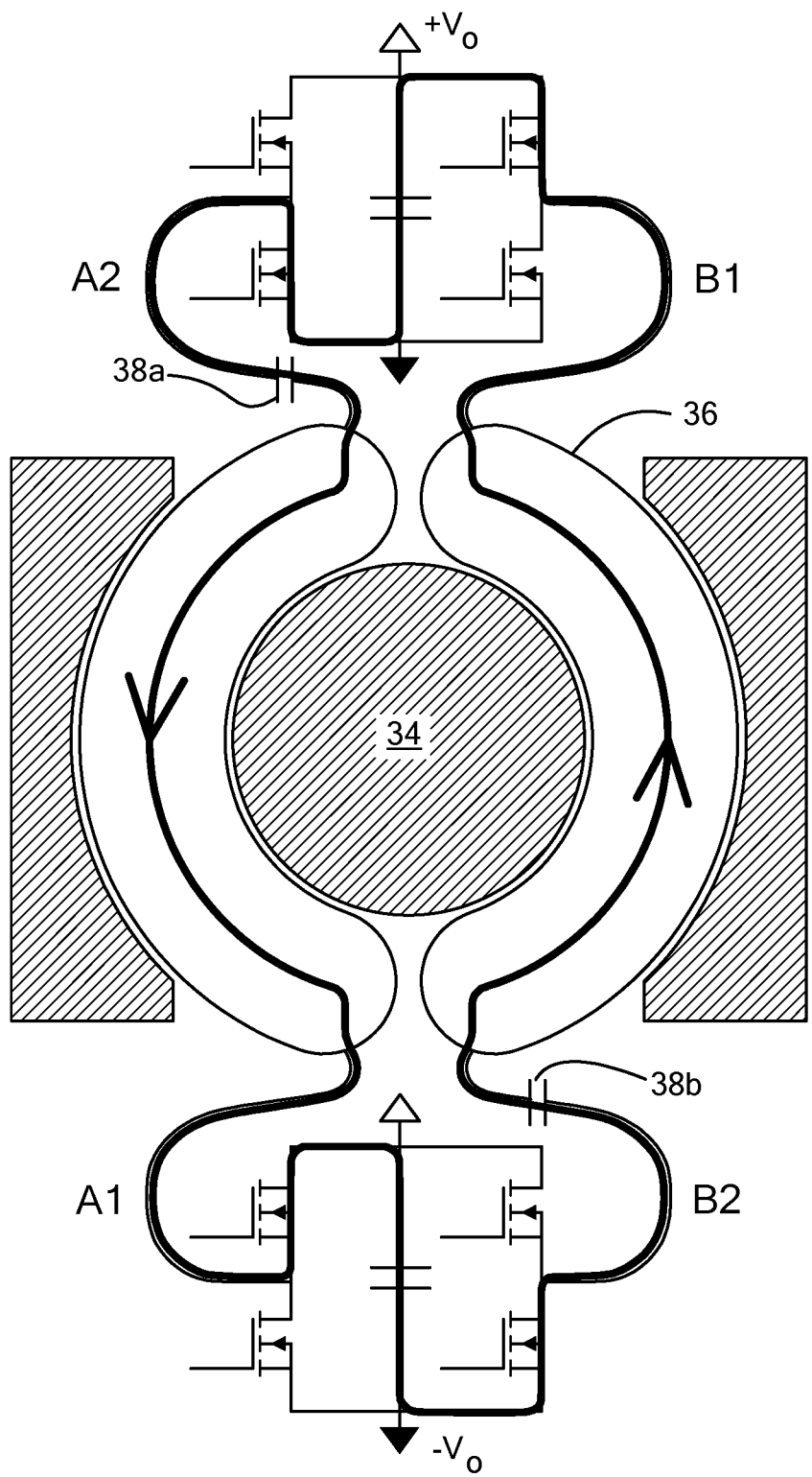
FIGS. 4A, 4B are schematic diagrams which illustrate a path of induced secondary ac current when operating in a full-bridge/full-bridge mode (FIG. 4A) and a full-bridge/zero mode (FIG. 4B)
Figure 4B:
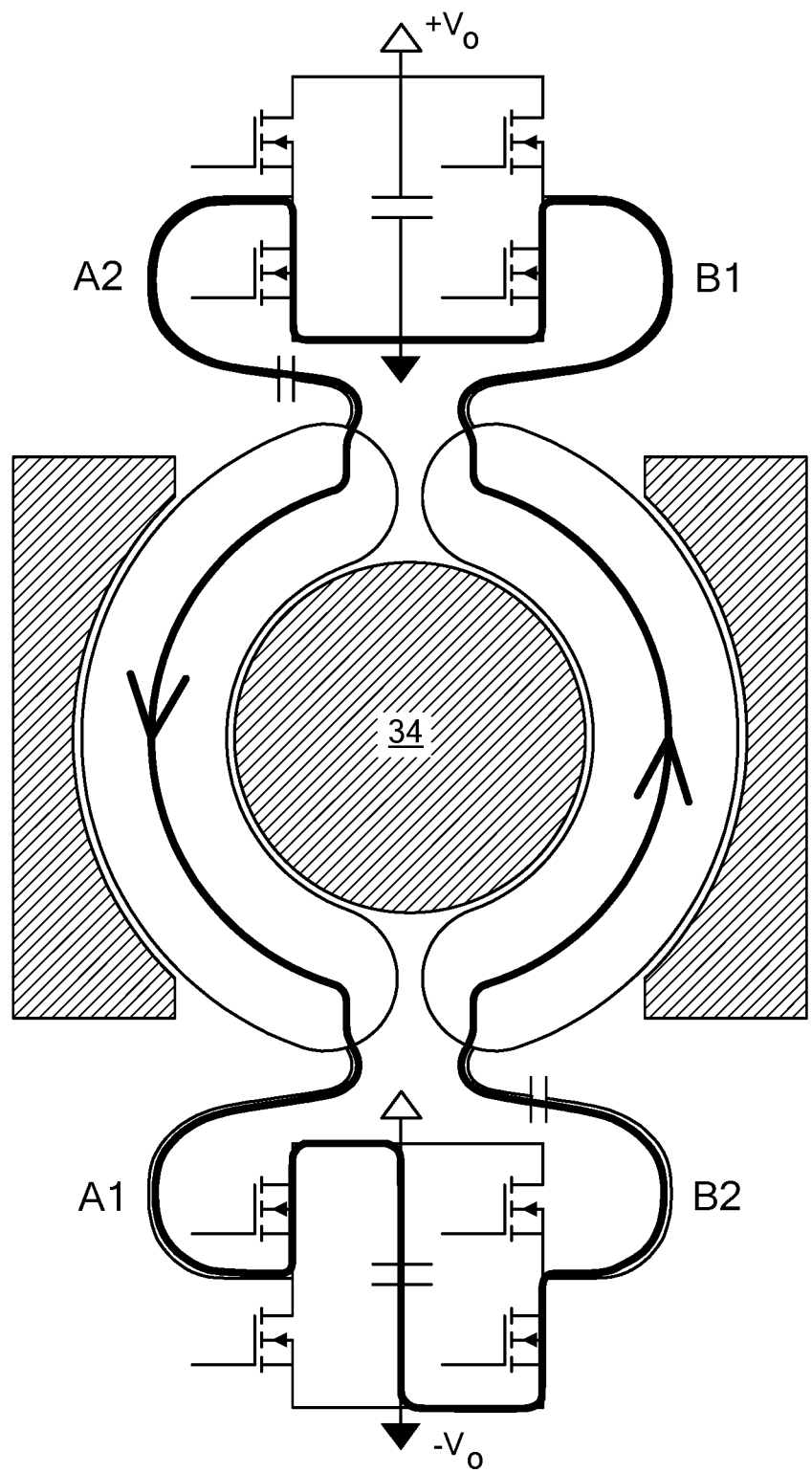

The principle of operation can be intuitively understood by considering the path of the induced secondary-side current. For example, consider operating in a "full-bridge/full-bridge" (FB/FB) manner in which rectifiers A and B are both in full-bridge mode and cell A1 is switched in-phase with cell B1. Assume that flux through the core is generated by applying an ac voltage with peak $V_p$ onto $N_p$ primary turns such that ac current 36 is induced in the secondary winding as shown in FIG. 4A. Under these conditions, when operating in full-bridge/full-bridge mode, as illustrated in FIG. 4A, the induced current flows such that the output voltage $V_o$ is inserted twice into the secondary loop. Equating the V/N ratios in this case, $$\frac{V_p}{N_p} = \frac{2V_o}{1}$$

Simplifying, $$V_o = V_p \frac{1/2}{N_p}$$

This is equivalent to the voltage conversion ratio of an $$N_P : \frac{1}{2}$$

transformer.

Now consider operation in the half-bridge/half-bridge (HB/HB) mode where both rectifiers act as half-bridges. Note that in this operating mode series capacitors 38a, 38b are required to prevent dc voltage from being applied across the windings. The path of induced secondary current is identical to the full-bridge/full-bridge case but now only yields a single $V_o$ insertion into the loop due to the voltage-halving action of the half-bridges. Thus, the voltage conversion ratio is changed to $$V_o = V_p \frac{1}{N_p},$$

This is equivalent to the conversion ratio of an $N_p$:1 transformer.

It should be appreciated that the implementation of half-turns and quarter-turns described below represent only an illustrative embodiment. Alternative implementations are possible, including distributing the copper traces of each fractional turn on a plurality of the layers of a printed circuit board, or using wound wire. It should also be appreciated that the length and width of the fractional turns are controllable and that a half-turn or quarter-turn need not have a length that is precisely one-half or one-quarter of the core window length, respectively. For example, the rectifiers can be placed inside the window of the transformer, shortening the length of each fractional turn Referring now to FIG. 4B, by operating in a "half-bridge/zero" (HB/0) mode, it is similarly possible to achieve a conversion ratio of $$V_o = V_p \frac{2}{N_p},$$

equivalent to an $N_p$:2 transformer. It is likewise possible to operate in a "full-bridge/half-bridge" (FB/HB) mode that provides a conversion ratio of $$V_o = V_p \frac{2}{3N_p},$$

equivalent to an $N_p$:(2/3) transformation ratio.

Figure 5:
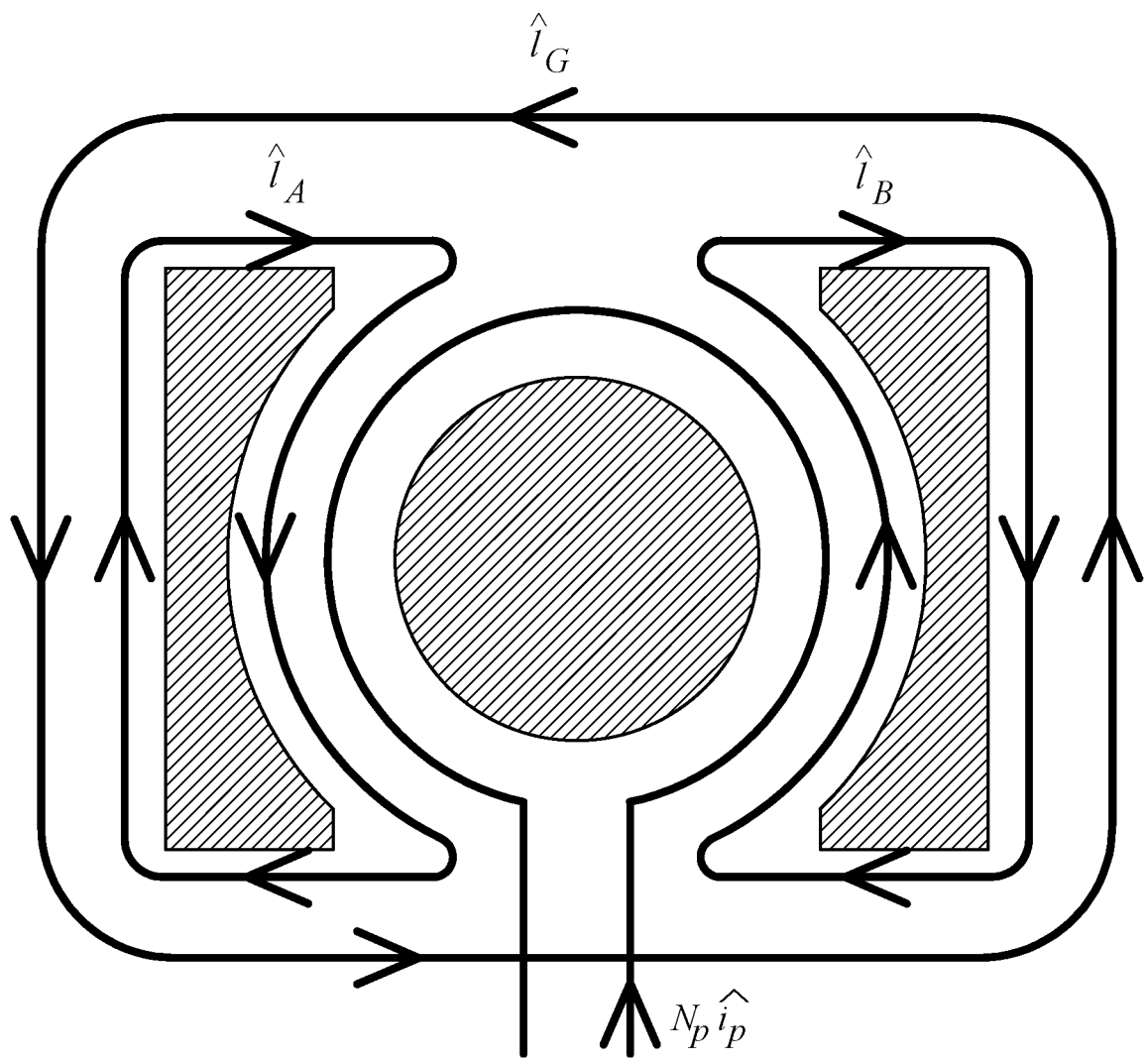
FIG. 5 is a model of the current flow around the core, used to derive the magnetic circuit model of the VIRT.

Referring now to FIG. 5, to derive a magnetic circuit model of the VIRT, the current flow in the system may be described by closed loops around the core. To achieve a model in this form, "virtual" current components are employed such that all currents form closed loops around the core. Currents $\hat{i}_A$ and $\hat{i}_B$ represent the currents that flow between the half-bridge cells in rectifier A and B (e.g. see FIG. 3, 4A, 4), respectively. For the purposes of modeling, these currents are drawn as returning outside the core via a ground plane. Note that these virtual currents, $\hat{i}_G$ and the out-of-core components of $\hat{i}_A$ and $\hat{i}_B$, cancel one-another and are invoked exclusively for modeling purposes. That is, virtual current component $\hat{i}_G$ is included in the model where $\hat{i}_G \approx \hat{i}_A \approx \hat{i}_B$ such that the (virtual) outer current components of $\hat{i}_A$ and $\hat{i}_B$ are cancelled. The resulting net current flow in this model is equivalent to the physical current that flows through each half-turn as in FIG. 4A.

Figure 6A:
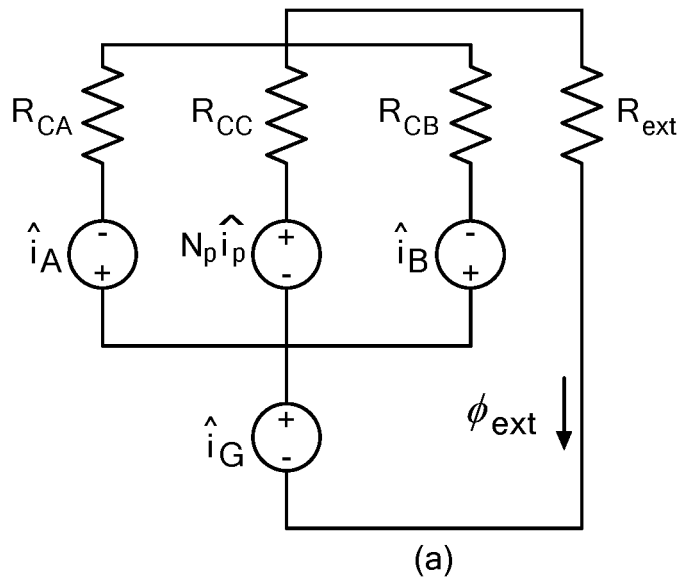
FIGS. 6A-6C are a series of magnetic circuit models of the VIRT where FIG. 6A corresponds to a full model.
Figure 6B:
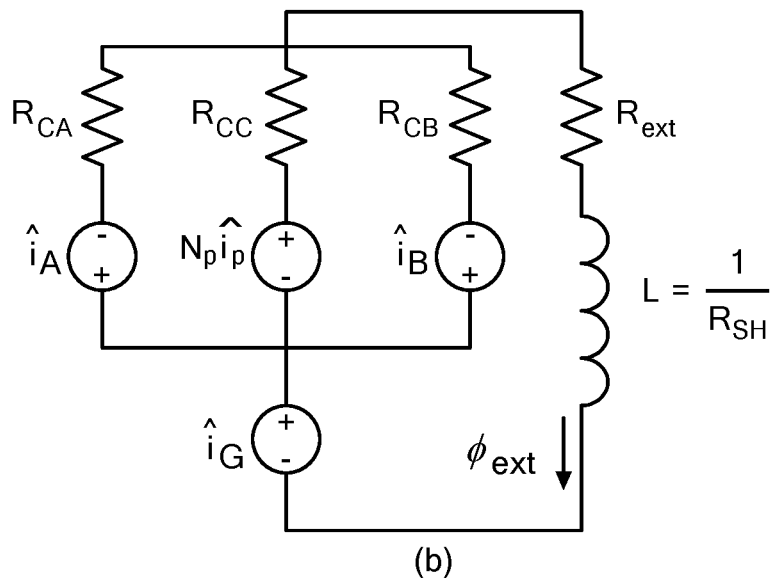

From the model of FIG. 5, it is straightforward to synthesize the magnetic circuit model shown in FIG. 6A. In practice, the magnetomotive force (MMF) associated with $\hat{i}_G$ arises due to the small resistance $R_{SH}$ of the ground-plane, thus this MMF can be modeled by a transference element $\mathcal{L}$ as shown in FIG. 6B. In the limit where $R_{SH} \to 0$, $\mathcal{L} \to \infty$ and the circuit simplifies as shown in FIG. 6C.

Figure 6C:
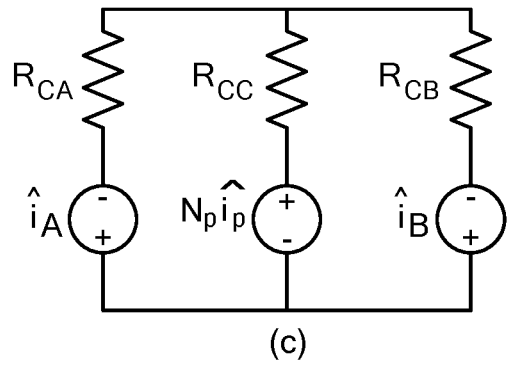
Figure 7A:
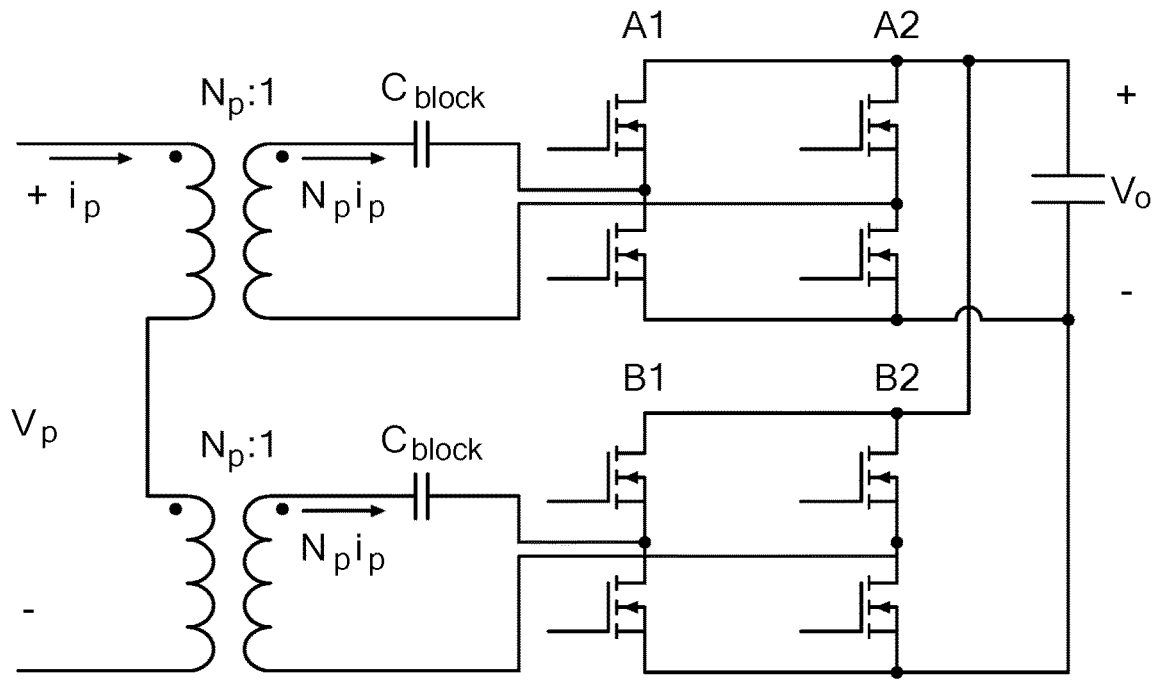
FIG. 7A is a simplified electrical model of the VIRT.
Figure 7B:
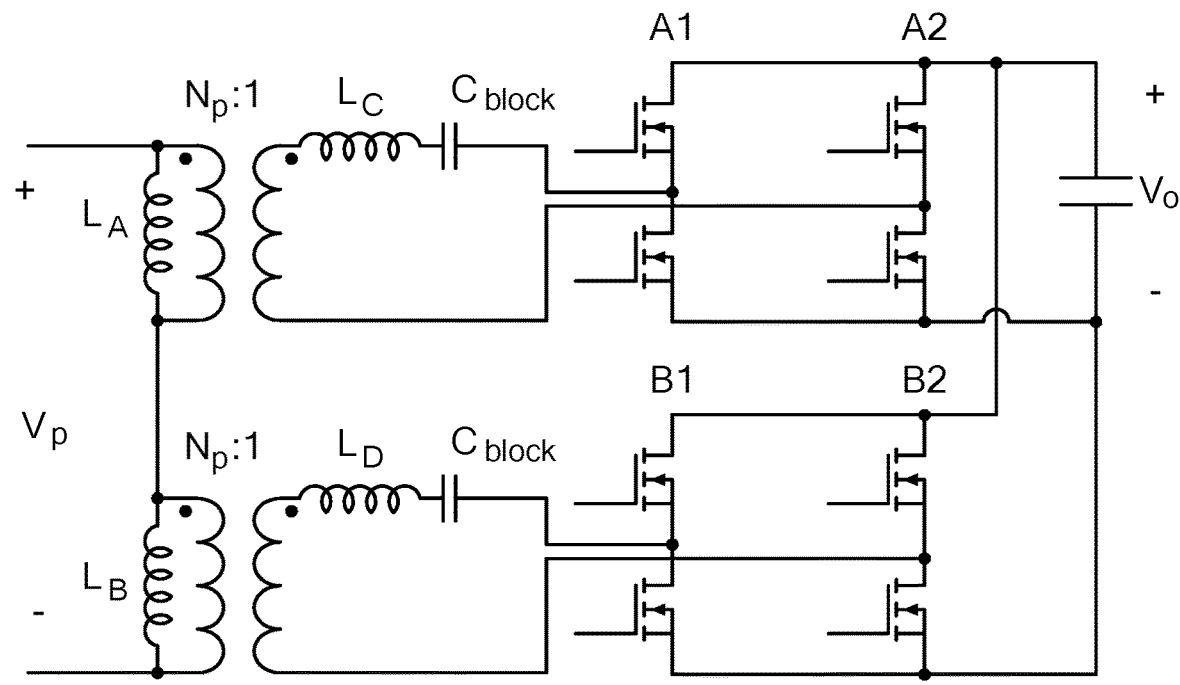
FIG. 7B is a model of the VIRT including magnetizing and leakage inductances.
Figure 7C:
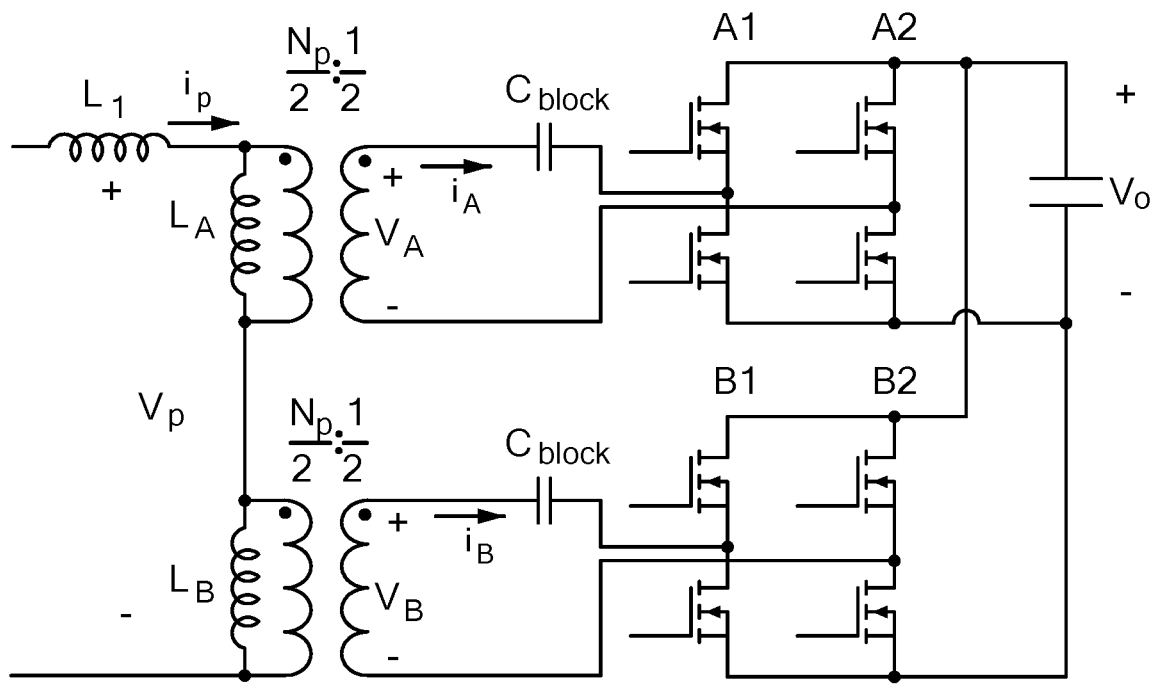
FIG. 7C is a simplified electrical model of the VIRT.

From the simplified magnetic circuit model of FIG. 6C and assuming symmetry between the core legs so that $R_{CA} = R_{CB}$, the simplified electrical models in FIGS. 7A and 7C can be derived. It should be noted that FIG. 7C shows the transformers having Np/2:½ ratios rather than Np:1 ratios shown in FIG. 7A. While these are equivalent, but FIG. 7C better reflects the "real" numbers of effective turns with the same "total" numbers of turns. It should also be noted that with further modeling it can be shown that each $N_p$ transformer does provide a magnetizing inductance and leakage inductances as in FIG. 7B. Thus, this is a very apt model. Magnetizing and leakage elements of the VIRT magnetic structure can be used as a part of a resonant or other soft-switched converter.

Figure 8:
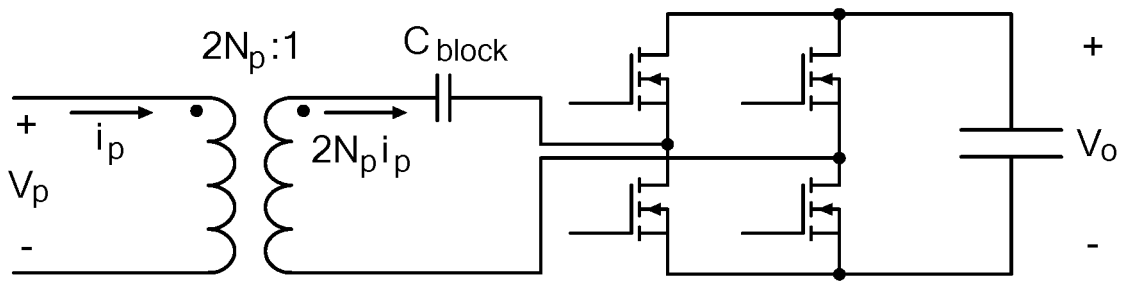
FIG. 8 is a prior art $2N_p$:1 transformer connected to a full-bridge rectifier.

Referring now to FIG. 8, a conventional the $2N_p$:1 transformer/rectifier structure is shown. It is insightful to compare the model of FIG. 7A with the $2N_p$:1 transformer/rectifier structure in FIG. 8. For ease of comparison it is assumed that all rectifier switches can be soft-switched, and conduction loss is the only source of loss in the switches. This can be achieved, for example, if the transformers are connected as part of an LLC converter.

When operating in FB/FB mode, and assuming square-wave modulation, the input to each rectifier in FIG. 7 is a square wave with peak $V_o$. These voltages are reflected across the transformer yielding $$V_o = V_p \frac{1/2}{N_p}$$

Those of ordinary skill in the art should be appreciate that that "square-wave" modulation refers to a version of the "switching" pattern discussed above, in which a half-bridge cell switches between states as follows: 1, 3, 2, 3, 1, 3, 2, 3, 1, . . . .

In square-wave modulation, State 3 is relatively short (theoretically instant) and the end result is that the output of the cell has the appearance of a square wave.

When operating the conventional $2N_p$:1 transformer in the same mode, the same expression is derived. This is an expected outcome from the transition between a $2N_p$:1 transformer and an $$N_p : \frac{1}{2}$$

transformer: the voltage conversion ratio is not changed when the number of primary and secondary turns are scaled by the same multiple.

Although the VIRT requires twice the number of switches than the conventional full-bridge rectifier of FIG. 8, the conventional configuration must employ switches that are rated for twice the current. The net effect of this is that the conduction loss in both configurations is identical for the same transistor area. This aligns well with the expectation that the overall current flow across two transformers with the same voltage conversion ratio should not be impacted by the number of turns used to create that conversion ratio. Moreover, as the rectifiers are physically distributed in the VIRT structure (while they are co-located in the conventional implementation), there can be benefits in reducing parasitic ac resistance in interconnecting the transformer to the VIRT rectifier elements; this can be particularly valuable in high-current applications.

A trade-off between copper loss and core loss between these two configurations is also evident. For the same output voltage $V_o$, both configurations have the same primary voltage $V_p$ but the $2N_p$:1 transformer divides this voltage on twice as many turns as the VIRT, reducing the peak flux density and therefore the core loss. Similarly, for the same current $i_p$ in the primary, the $2N_p$:1 transformer carries twice the current in its secondary compared to the VIRT, thus increasing its copper loss.

There are four additional modes available to the VIRT in this example and their voltage conversion ratios are summarized in Table 1 (i.e. Table 1 shows a comparison of voltage conversion ratios for each VIRT mode).

TABLE 1

| Mode | Conventional, $2N_p$:1 | VIRT, $N_p:\frac{1}{2}$ |
| --- | --- | --- |
| FB/FB | $V_o = V_p \frac{1/2}{N_p}$ | $V_o = V_p \frac{1/2}{N_p}$ |

TABLE 1-continued

| Mode | Conventional, $2N_p{:}1$ | VIRT, $N_P{:}\frac{1}{2}$ |
|---|---|---|
| HB/HB | $V_o = V_p \dfrac{1}{N_p}$ | $V_o = V_p \dfrac{1}{N_p}$ |
| FB/HB | — | $V_o = V_p \dfrac{2}{3N_p}$ |
| FB/0 | — | $V_o = V_p \dfrac{1}{N_p}$ |
| HB/0 | — | $V_o = V_p \dfrac{2}{N_p}$ |

Example switching patterns that can be used to implement the modes are provided in Table 2 (i.e. Table 2 illustrates example switching patterns for each VIRT mode).

TABLE 2

| Mode | Switching pattern |
|---|---|
| FB/FB | A1 and A2 switched complementary<br>B1 and B2 switched complementary<br>A1 switched in-phase with B1 |
| HB/HB | A2 and B2 held in low state (or alternatively in high state)<br>A1 and B1 switched in-phase |
| FB/HB | A1 and A2 switches complementary<br>B2 held in low state (or alternatively in high state)<br>A1 and b1 switched in phase |
| FB/0 | B1 and B2 held in low state (or alternatively in high state)<br>A1 and A2 switched complementary |
| HB/0 | B1, B2, A2 held in low state (or alternatively in high state)<br>A1 switched |

It should be noted that the HB/HB mode follows an identical discussion as the FB/FB mode with the exception that the output of each rectifier is now a square-wave with peak $$\frac{V_o}{2},$$

thus yielding an $N_p{:}1$ voltage conversion ratio.

The special case of operating one of the rectifiers in the "zero" mode is not available to the conventional configuration and enables an additional conversion ratio for the VIRT converter. As can be derived from FIG. 7, the conversion ratio in FB/0 mode is half that of the FB/FB mode. Similarly, the HB/0 mode conversion ratio is half that of the HB/HB mode. Likewise, in FB/HB mode, the conversion ratio is 4/3 that in FB/FB mode.

When operating in FB/HB, FB/0 or HB/0 mode, there is no direct comparison to the conventional $2N_p{:}1$ transformer configuration. Instead, these modes offer trade-offs beyond simply scaling the turns to reduce total transformer loss. The description provided herein focuses on the HB/0 mode as it enables a voltage conversion ratio that is unachievable by the conventional configuration.

Figure 9:
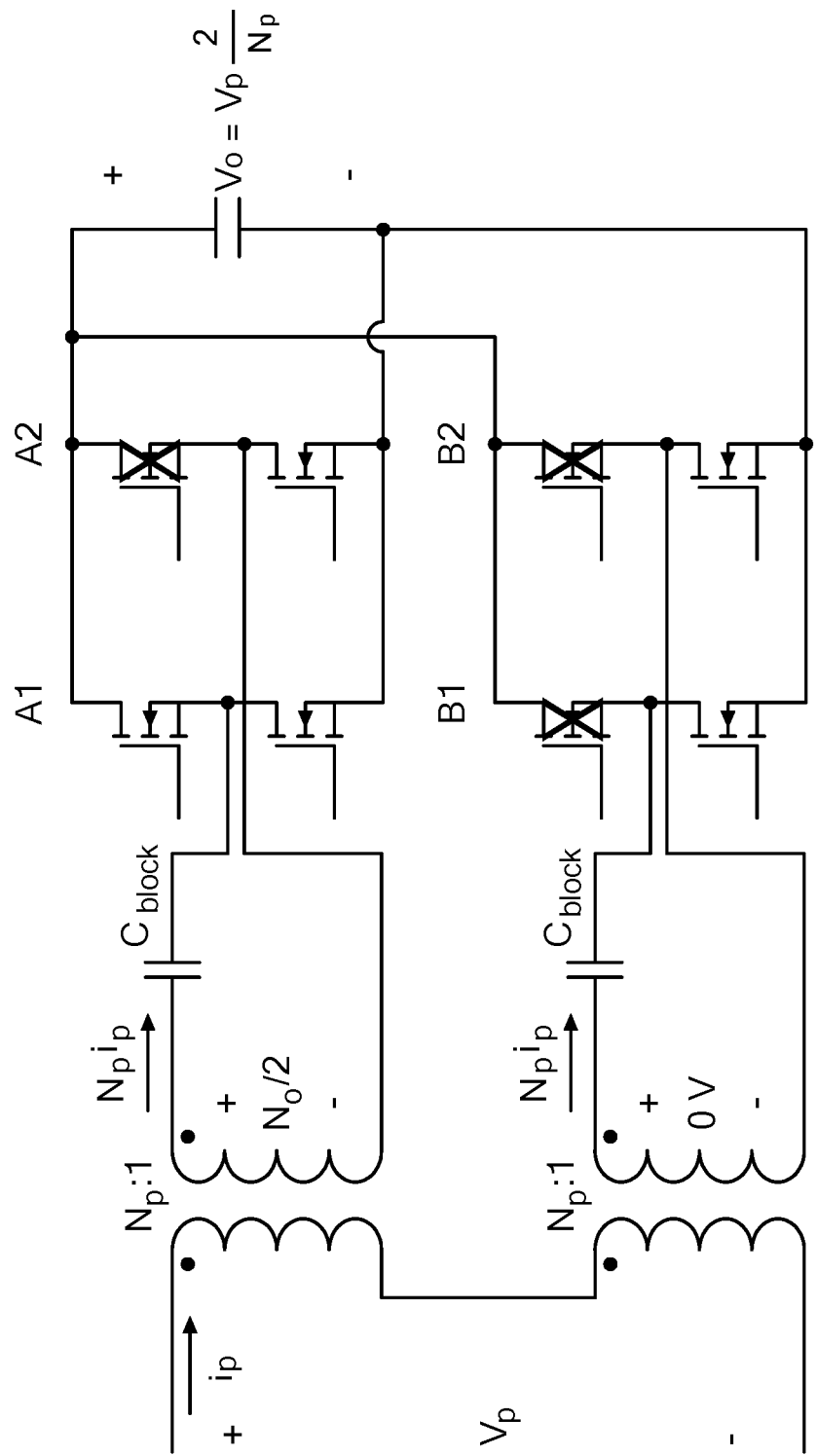
FIG. 9 is a simplified VIRT electrical model in the HB/0 mode.

Consider operating the rectifiers as in FIG. 9 such that A2, B1, and B2 are in the low state while A1 remains switching. The voltage conversion ratio is $$V_o = V_p \frac{2}{N_p}.$$

Figure 10:
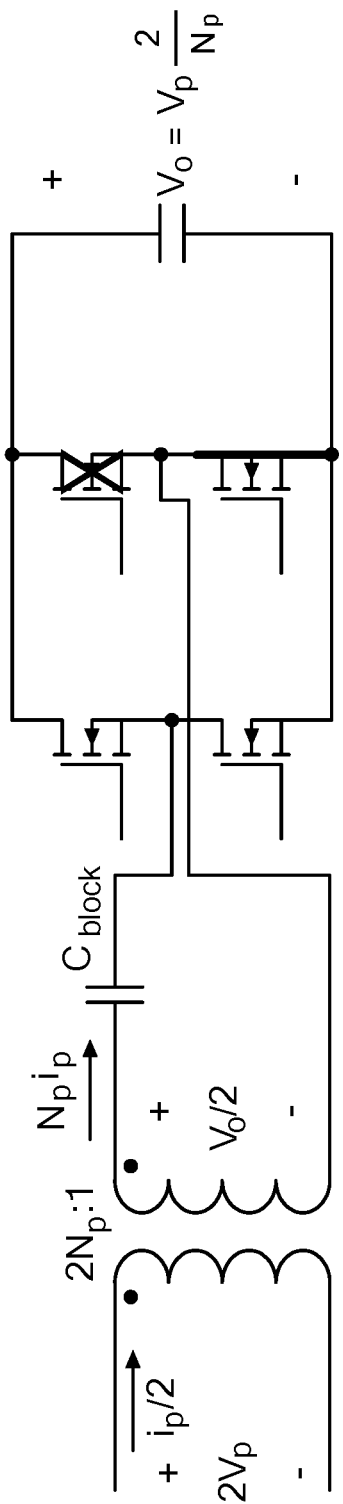
FIG. 10 is a prior art $2N_p$:1 converter in HB/0 mode operating with the same output voltage as in the VIRT HB/HB mode.

To achieve the same output voltage in the conventional $2N_p{:}1$ configuration, twice the voltage must be applied to the primary as shown in FIG. 10. Similarly, for the same power throughput, half the current flows through the primary in the conventional configuration.

Without considering the impact of trace-width spacing and assuming a planar transformer, the dc resistance of the primary turns in the conventional configuration is four times larger than in the VIRT. Therefore, although the VIRT carries twice the current on its primary, the copper loss between the two configurations is theoretically identical.

In practice, the converter structure (e.g. inverter, resonant tank elements, etc.) coupled to the input of each configuration will not necessarily be operating in an identical manner, and a detailed comparison is required to determine which configuration "wins out" in terms of copper loss. For example, if the transformers are interfaced with inverters and passive components to form LLC converters, then the frequency of operation required to achieve the desired voltage conversion ratio will dictate the magnetizing current that flows and this directly impacts the resulting copper loss.

The HB/0 configuration experiences increased core loss over the conventional case. While both configurations have the same V/N ratios on their primaries, zeroing rectifier B has the effect of creating a short-circuit around the right-side core leg in FIG. 4. In practice, this short-circuit will have some small resistance characteristic (i.e. the resistance with not be exactly zero) and this allows flux through this section of the core leg as modeled by a transferance term (e.g. see E. R. Laithewaite, "Magnetic equivalent circuits for electrical machines," Proceedings of the Institution of Electrical Engineers, vol. 114, no. 11, pp. 1805-1809, November 1967.). Assuming this resistance is negligible, the peak flux density in the HB/0 case is doubled and the effective core volume is halved. This yields an overall increase in core loss due to the superlinear dependence on flux density.

A separate detriment to HB/0 operation is that eight switches are required for such operation and each switch must be rated for current $N_p i_p$. In the conventional configuration, on the other hand, only four switches with the same rating are required. This implies an increase in the conduction loss of the switches for the same transistor area.

Overall, conclusions on the benefit of zero-mode operation over "extended HB" operation will depend upon the specific operating point of a given configuration. If the voltage doubling and associated penalties of the VIRT HB/0 mode outweigh the penalties associated with increasing the gain of the converter used in the $2N_p{:}1$ configuration, then the technique is worth applying.

It is important to note that if the HB/0 mode is unfavorable in a particular design, then the HB/HB mode can be employed instead to achieve the same trade-offs as described above (i.e. trade-offs between copper loss and core loss). The ability to operate in a "zero" mode only provides additional flexibility.

It should now be appreciated that the high degree of re-configurability of the VIRT technique is particularly valuable in applications where there is the requirement for a wide operating range (in voltage, current, or power) and/or where the converter should be designed to be used for different applications. For example, one might want to have a single converter which can operate well for a wide variety of output voltage specifications. Such a wide variety of output voltage specifications can be well accommodated by re-configuring the operation of the VIRT based upon the desired voltage.

For clarity, the examples described above focused on a single, illustrative implementation of the VIRT technique using half-turns and two rectifiers. In practice, there are numerous variants of the described concepts and technique only some of which are next described. For example, instead of using half-turn fractional-turn sections, one could use one-third turn, quarter-turn or other fractional sections with associated switching cell blocks, or other non-integer turn counts. It should, of course, be appreciated that all of such variants are considered to be within the scope of the concepts covered by this patent.

It should also be appreciated that the examples described above have focused on the use of "fractional turns" and re-configurability afforded by the VIRT structure in the context of application to the rectifier. However, it should be further appreciated that this can be equally applied to the inverter structure and operation in a converter, or to both inverter and rectifier subsystems. Additionally, there is no requirement that the inverter or rectifier structures be on the secondary-side of the transformer. That is, the non-integer turns and inverter or rectifier structures can be placed on the transformer primary-side as well as, or instead of, on the transformer secondary-side.

In general, it should be understood that the number of fractional or non-integer turns and associated converters that are used can be increased beyond two, to arbitrary numbers within practical geometric and design constraints. When doing so, it is desirable that the converters be placed such that their connections remain close to the fractional turn interconnection points at the core to minimize parasitic conduction losses. It is also desirable for many designs that the converters be distributed in a balanced fashion around the core (e.g., such that the resulting secondary-side structure is substantially rotationally symmetric) with switching patterns for co-located switching cells ensuring that secondary ac winding currents principally close around the core centerpost with external ac currents outside the core substantially cancelling for at least some operating modes, thereby reducing conduction loss.

Thus, in preferred embodiments, the rectifiers/inverters are physically close to the half-turns in order to exploit the half-turns benefit of reduced conduction path length, and that they are as identical as possible in their layout around the core (to match the modeling assumption).

In practical systems, this may appear as symmetry of the half-bridge cell placements across the central longitudinal and latitudinal axes of the transformer core. However, VIRT will still work even if one does not maintain precise symmetry. Thus, cell placements may be considered as being balanced rather than having ideal symmetry.

As noted above, the instance of VIRT in FIG. 3 yields four unique effective turns ratios, including a half-turns ratio of $N_p$:0.5. Permutations of this fundamental structure can be implemented by changing the number of core sections and/or the rectifier types in order to achieve additional and extended conversion possibilities. For example, one can use 4 full-bridge rectifiers connected through "quarter-turns" on a 5-legged core (a center post and 4 return legs) as in the illustrative embodiment of FIG. 11A, or 3 full-bridge rectifiers connected through "third-turns" on a 4-legged core (a center post and 3 return legs) as in FIG. 11B. While we illustrate designs with full-bridge rectifiers comprising half-bridge switching cells, it will appreciate that other converters (e.g., inverters, rectifiers, and cycloconverters) can be utilized, including multilevel converters, single-switch converters (such as class E and class phi structures), voltage- or current-multiplying converters, etc.

Figure 11A:
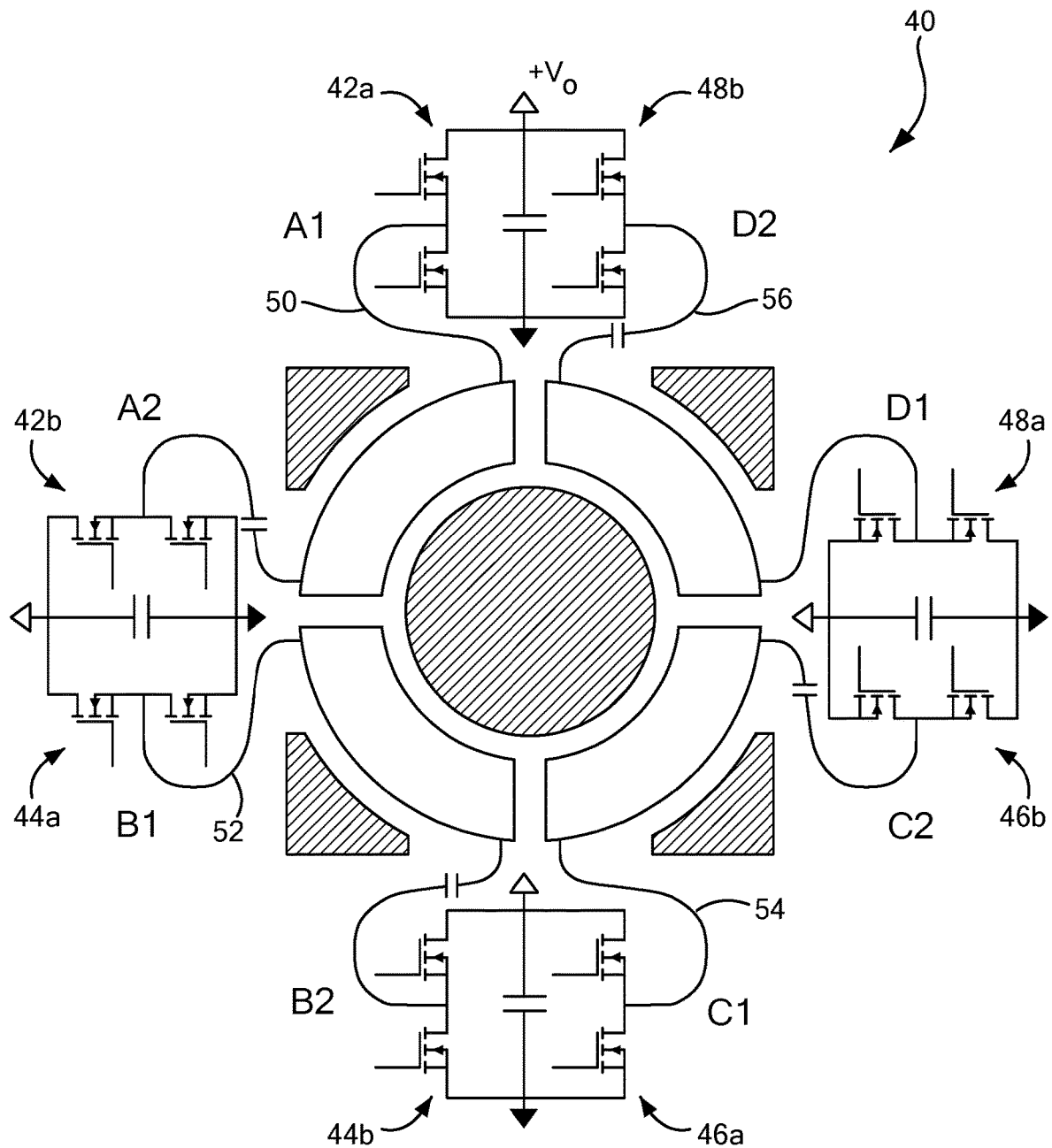
FIG. 11A is a schematic diagram of an alternate embodiment of a VIRT having four rectifier/inverters coupled via quarter-turns around a 5-legged core.
Figure 11B:
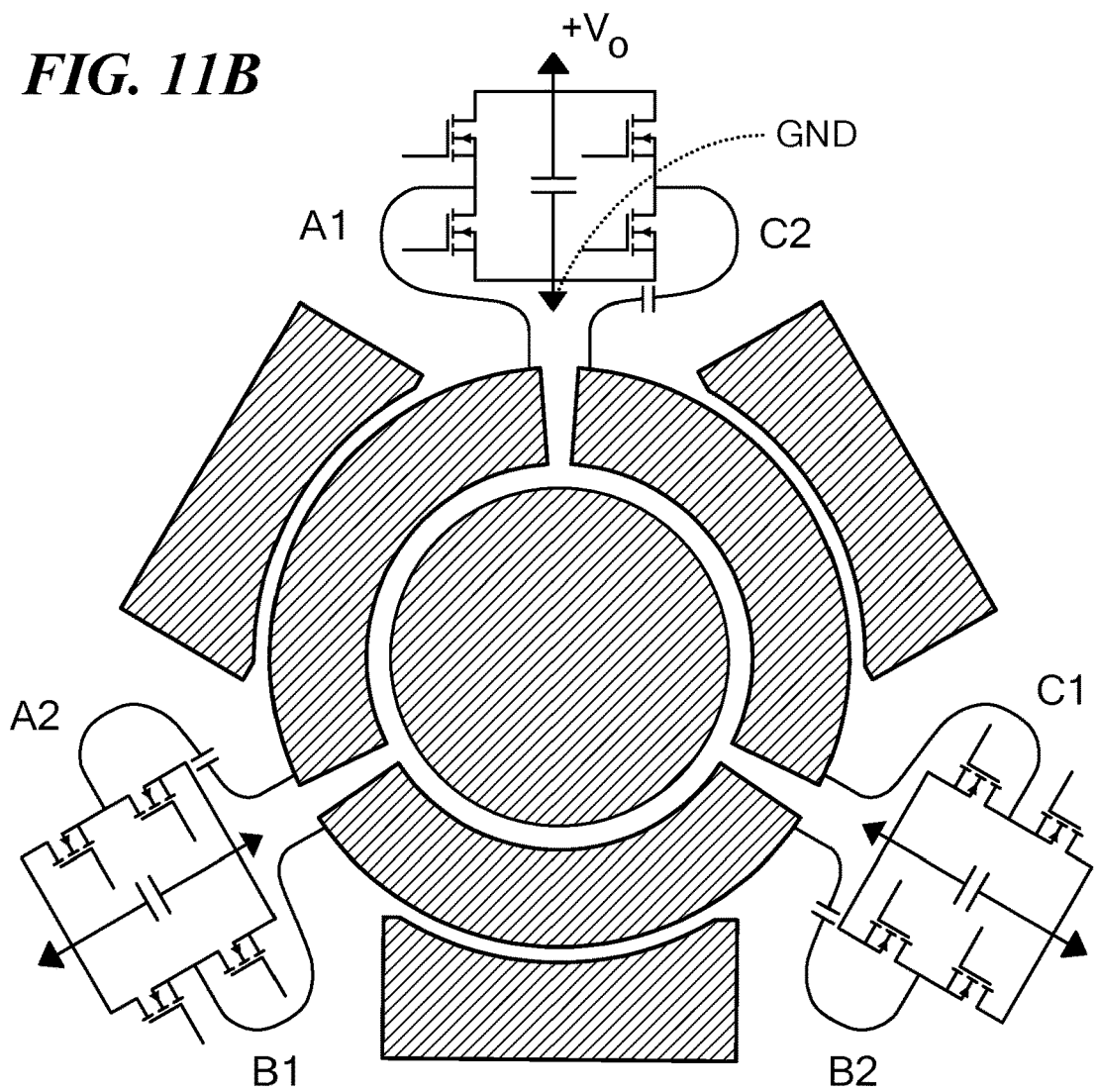
FIG. 11B is a schematic diagram of an alternate embodiment of a VIRT having three full-bridge rectifiers coupled through third-turns on a 4-legged core.

Referring now to FIG. 11A, a VIRT includes full-bridge rectifiers 42, 44, 46, 48 coupled through "quarter-turns" 50, 52, 54, 56, around a 5-legged core 60. In this embodiment, core 60 is provided having a commonly available core shape (sometimes referred to as an X-core shape).

Many conventionally available core shapes can be used for such designs, including E, EQ, RM, PQ, X and EX core shapes. It should, of course, be understood that customized core shapes can be used to extend this approach to any number of subsections. Those of ordinary skill in the art will appreciate how to select a core having a particular shape to suit the needs of a particular application.

Furthermore, after reading the description provided herein, those of ordinary skill in the art will also appreciate how to select the number and placement of rectifiers/inverters/cycloconverters around the core to achieve a desired operational characteristic. One of ordinary skill may select the number of converters such that they interconnect among the fractional turns to realize a net integer number of turns around a core centerpost. As one increases the number of core sections and converter blocks, one can increase the "fractionalization" of the fractionalized winding set, providing greater voltage conversion ratios, a greater degree of freedom in trading core and copper loss to minimize total transformer loss, and increasing the number of operating mode and effective transformation ratios that may be achieved, at the expense of design and control complexity.

When all the rectifiers in FIG. 11A are active and operating as full bridges, the effective turns ratio is Np:0.25 and the tradeoffs at least somewhat mimic those described above for the Np:0.5 turns ratio configuration achievable in the VIRT structure of FIG. 3. The Np:0.25 configuration, however, enables a further possibility to trade-off between core loss and copper loss of the transformer to minimize total loss as compared to the Np:0.5 turns ratio VIRT configuration of FIG. 3.

As shown in FIG. 11 A, the VIRT is implemented with four variable rectifiers 42, 44, 46, 48 disposed symmetrically (i.e. proximate to the quarter turns in an identical layout) around a 5-legged core and connected with "quarter turns" with each variable rectifier comprising two t half-bridge switching cells. These cells are also disposed symmetrically (i.e. proximate (and ideally, as close as possible) to the quarter turns in an identical layout) around a core as shown. In practical systems, this would likely end up being a kind dual symmetry about the central longitudinal and latitudinal axes. There are Np primary turns wound around a center post (not shown in FIG. 11A). Multiple additional modes are achievable compared to the 3-legged core version described above in conjunction with FIG. 3 including "FB/FB/FB/FB" mode, which yields an Np: 0.25 effective conversion ratio.

Thus, the illustrative embodiment of FIG. 11A is a structure which can achieve eight effective turns ratios, as listed in Table 3 below (i.e. Table 3 is an example of effective turns ratios achievable in the 5-legged, quarter-turn VIRT configuration of FIG. 11).

TABLE 3

| VIRT Mode | Effective turns ratio |
|---|---|
| FB/FB/FB/FB | Np:1/4 |
| FB/FB/FB/HB | Np:2/7 |
| FB/FB/HB/HB | Np:1/3 |
| FB/HB/HB/HB | Np:2/5 |
| HB/HB/HB/HB | Np:1/2 |
| HB/HB/HB/0 | Np:2/3 |
| HB/HB/0/0 | Np:1 |
| HB/0/0/0 | Np:2 |

One of ordinary skill in the art can arrive at the details of each operating mode which can be developed and understood using the modeling techniques described above.

Figure 12:
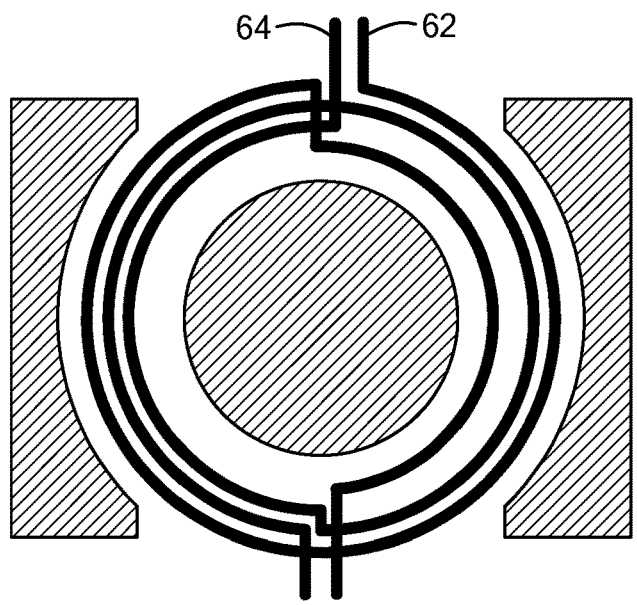
FIG. 12 is a VIRT technique employing two sets of one-and-a-half turns on the secondary. The terminal connections of the rectifiers is the same as in FIG. 2.

One of ordinary skill in the art will now also appreciate that the concept of fractional turns can be extended to "integer-and-a-half" turns (e.g. one-and-a-half, two-and-a-half, etc.) to yield turns ratios with fractional components greater than one (e.g. $N_p$:1.5, $N_p$:2.5, etc.). An illustration of the meaning of "one-and-a-half" turns is shown in FIG. 12. Likewise, it can be expanded to "integer plus a fraction" turns. This may be done on the secondary and/or primary.

Referring now to FIG. 12, is a VIRT technique employing two sets 62, 64 of one-and-a-half turns on the secondary. The terminal connections of the rectifiers may be the same as or similar to that described above in conjunction with FIG. 3.

Although the above description focused on operation of the rectifiers to accommodate square-waves, it should, of course be appreciates that there is no requirement that this be the case. That is, the concepts, systems, circuits and techniques described herein may still be used in an input waveform having any conventional or unconventional shape. Even for half-bridge cells (as described above), imposing zero states (when both devices in a given half-bridge cell are held off for some duration) allows "non-square" voltage waveshapes at a half-bridge terminal; this might be done in an LLC type converter operating below resonance, for example. Likewise, a rectifier such as a current-mode class D rectifier may impose a half-sine voltage at a rectifier input terminal (and a sinusoidal voltage across a given secondary winding section), and a multilevel rectifier may provide multiple discrete voltage levels at a rectifier terminal over the course of an operating cycle. The only requirement is a suitable placement and control of the rectifiers/inverters/cycloconverters to maintain desirable ac current flow paths and the ability to change their modes if re-configurability is desired.

For example, if the switches in FIG. 7 are configured to operate as synchronous rectifiers (i.e. mimicking diode operation), capacitive current flow into the rectifier would yield "dead-times" where none of the switches are conducting—this does not violate the operation of the VIRT.

It should also be appreciated that much of the above description has been provided for rectifier topologies comprising half-bridge subsections. It will be appreciated that the half-bridge subsections could be replaced by other rectifier (or inverter or cycloconverter) topologies (converter topologies), including but not limited to class E or class Phi converters, current-mode class D converters, E/F converters, multilevel or switched-capacitor converters, voltage or current multiplier converters, or any combination thereof—to name a few examples.

Furthermore, the description above did not specify an inverter-side configuration. It will be appreciated that inverter configurations that can be interfaced to a conventional transformer can also be interfaced to the VIRT structure, including but not limited to full-bridge inverters, half-bridge inverters, stacked-bridge inverters, and single-switch inverters (e.g. class E, Phi, etc.). One may likewise utilize cycloconverter topologies to interface with the VIRT transformer. Likewise, one could apply various resonant tank elements (e.g. to form resonant converters) or use intermediate passives in the network (e.g. to form active bridge converters). One may use various combinations of structural and control techniques, including but not limited to variable frequency multiplier (VFX)—or burst-mode inverters or stacked architectures.

Additionally, it should be noted that employing a re-configurable inverter (e.g. a stacked architecture) enables the possibility of simultaneously re-configuring the inverter and rectifier (structure or operation) to enable efficient operation with wide output voltage range and wide power range.

The description provided above focused on applications in which a large (e.g. ratio of 20:1 or greater) step-down voltage conversion ratio was required. In one specific example, (i.e. a peak of 240 Vac [~375V] to as low as 5V) corresponds to a 75:1 step-down voltage. And/or where input or output voltages varied over a wide range (e.g. of a ratio of 3:1 or larger). However, it will be appreciated that the VIRT technique is similarly effective for large step-up voltage conversion ratios having low voltage inputs (e.g. including using a VIRT inverter structure with multiple inverter sets connected by fractional turns distributed around the core and using multiple operating modes to provide operating flexibility). Such implementations may be directly realized or arrived at via topological or time-reverse duality or bilateral inversion techniques. With appropriate subsystem selection (e.g., switching cell structures), the concepts, systems, devices circuits and techniques described herein improve the efficiency and size of many power electronic converters that employ transformers, including ac/dc, dc/dc, dc/ac, and ac/ac conversion systems. For example, this may include ac/dc converters such as grid-interfaced chargers, isolated dc-dc converters such as for telecommunications and transportation applications, dc/ac converters such as for grid-interfaced photovoltaic systems and uninterruptible power supplies, ac/ac converters such as for solid-state transformers, or any combination thereof—to name a few.

Illustrative design specifications for a converter that can benefit from the VIRT technique are listed in Table 4.

TABLE 4

| Parameter | Value |
|---|---|
| Input voltage range | 120-380 $V_{dc}$ |
| Adjustable output voltage (Rated output current) | 5 V (5 A); 9 V(4 A); 12 V (3 A) |
| Isolation rating between primary and secondary | 2.5 kV |

The example design of Table 4 is an LLC converter with an input voltage range of 120-380 $V_{dc}$ (corresponding to rectified universal ac voltage) and an adjustable output voltage of 5, 9, or 12 $V_{dc}$ (corresponding to the charging voltage of many smartphones, tablets, laptops, etc.; one could also consider a 15 V operating condition in place of the 12 V operating condition and could include an additional 20 V operating condition such as for laptops). The demanding step-down ratio and wide operating range of this specification make it well-suited for application of the VIRT technique.

Further example designs may be found in: M. K. Ranjram, I. Moon and D. J. Perreault, "Variable-Inverter-Rectifier-Transformer: A Hybrid Electronic and Magnetic Structure Enabling Adjustable High Step-Down Conversion Ratios," in IEEE Transactions on Power Electronics, vol. PP, no. 99, pp. 1-1 (Jan. 23, 2018), which is hereby incorporated by reference in its entirety.

Figure 13:
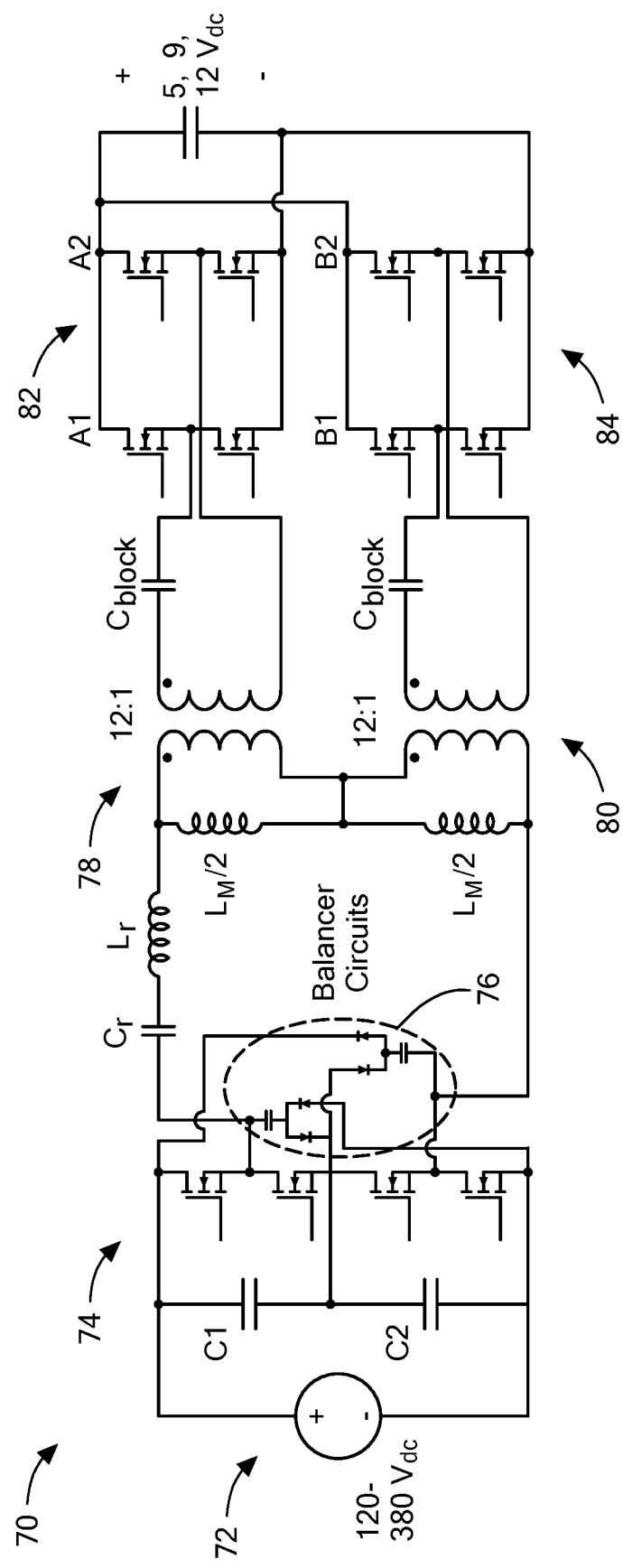
FIG. 13 is a schematic diagram of a combined LLC and VIRT converter.
Figure 14:
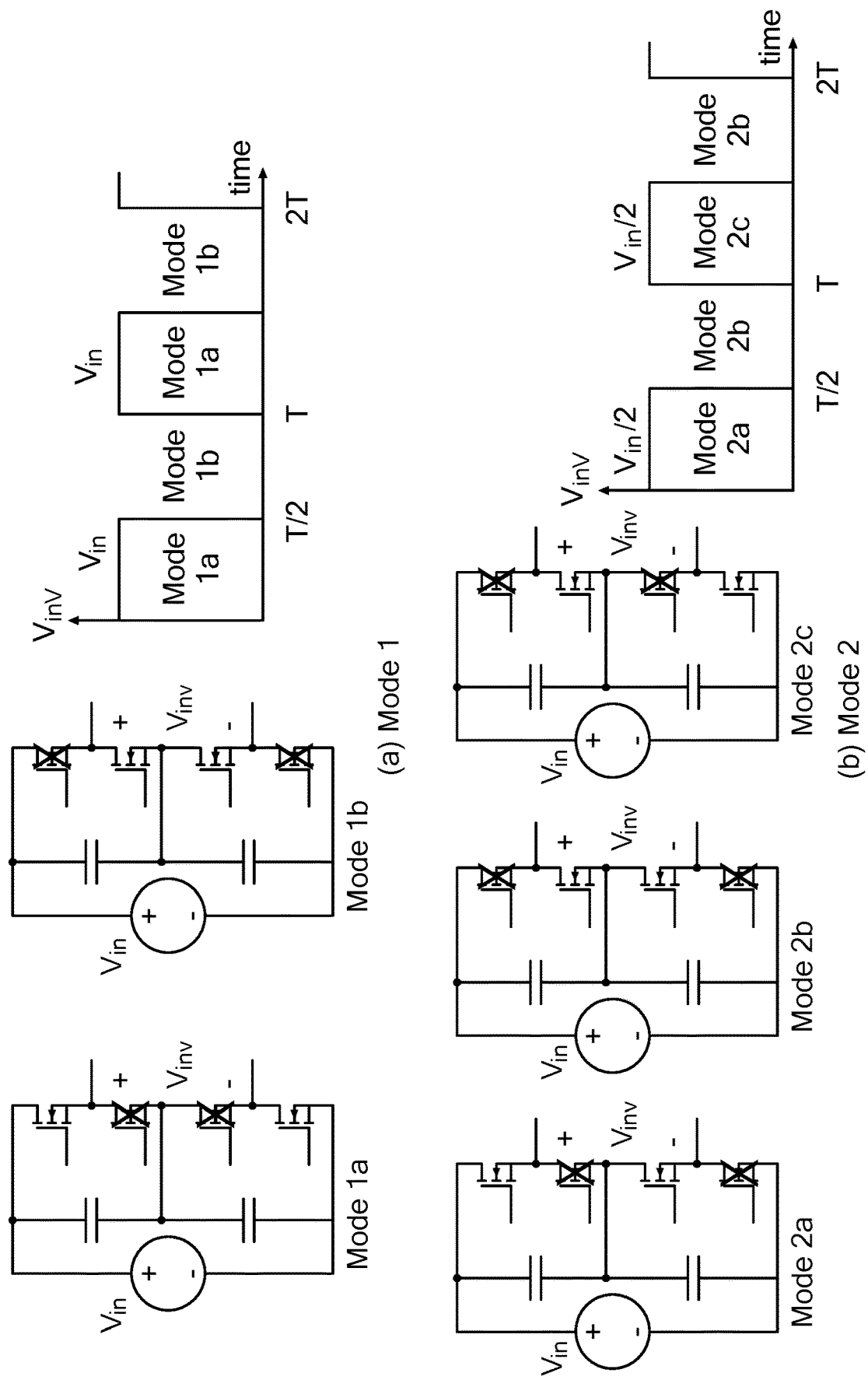
FIG. 14 is a stacked half-bridge capable of being operated in two modes to achieve voltage halving and voltage quartering of the input voltage.

Referring now to FIG. 13, a combined LLC and VIRT converter 70 capable of accepting an input voltage in the range of 120-380 $V_{dc}$ from a source 72, according to an exemplary embodiment. Converter 70 includes a bridge circuit 74, here comprising a stacked half-bridge architecture and balancer circuits 76 coupled thereto to ensure voltage balancing between input capacitors C1, C2.

The stacked half-bridge circuit 74 can be re-configured, for example, to achieve voltage halving or voltage quartering as shown in FIGS. 14A, 14B. Note that the average value of $V_{inv}$ does not contribute to the voltage conversion mechanism of an LLC and it is the peak ac voltage that is halved and quartered (compared to the input voltage) in modes one and two, respectively;

The inverter is operated with voltage halving when the input voltage is between 120 and 190 V, and voltage quartering when the input voltage is between 190 and 380 V. The result of this re-configuration is that an ac square-wave input to the LLC resonant tank has a peak voltage range of 47.5-95 V compared to the 60-190 V peak voltage range that would be achieved by a conventional half-bridge inverter. As noted above, balancer circuits 76 can be employed to ensure voltage balancing between the input capacitors C1, C2.

The VIRT structure includes two variable rectifiers 82, 84 comprised of respective ones of switches 82a-82d, 84a-84d. In an embodiment, each switch is operated as a synchronous rectifier. The FB/FB mode, where all the switches are active, is employed for a 5V output while the HB/HB mode, where half-bridge cells B2 and A2 are held in the low state, is employed for the 9 and 12 V outputs. The result of this re-configuration is that the effective dc output voltage that the LLC must regulate is compressed from 5-12 V to 4.5-6 V.

In embodiments, the rectifier switching scheme to achieve synchronous rectification may be implemented using a digital controller and conventional half-bridge gate drivers featuring independent PWM outputs. When the LLC is operated below-resonance, the switching pattern for synchronous rectification can be achieved via the "pulse-width clamp" method where the switches are held on for a known, fixed period of time (half of the resonant period minus dead time).

It should be appreciated that that in this exemplary embodiment, the additional conversion ratio offered by the HB/0 mode, which provides a further factor-of-two compression over the HB/HB mode, is not utilized. It should also be appreciated that this additional ratio could be valuable if an additional larger output voltage (e.g. 20V) is desired. Likewise, FB/HB mode could optionally be used to improve efficiency at some voltage levels.

Due to the re-configurability of the VIRT design, the LLC effectively interfaces a 47.5-95 V input to a 4.5-6 V output, corresponding to a reduction in the required step-down ratios from [10-76] to [7.92-21.1]. This 2.66 times gain variation can be reasonably accommodated by the LLC resonant tank, while the original 7.6 times gain variation would yield unacceptably large stress on the components of the LLC converter.

The LLC may be designed using a conventional procedure. A 24:1 transformer is employed instead of the minimum turns ratio of 22:1 because the resulting 12:0.5 VIRT ratio has a primary-turns count that can be easily distributed across multiple PCB layers.

In one illustrative implementation, normalized resonant tank parameters are $Q_e$=0.16 and $L_n$=7, with $Q_e$ associated with the 9V output at maximum power. A maximum switching frequency of 800 kHz is selected and the resulting component values are shown in Table 5.

TABLE 5

| Parameter | Value |
| --- | --- |
| Resonant frequency | $f_r$ = 1.1 MHz |
| Resonant capacitance | $C_r$ = 3.07 nF |
| Resonant inductance | $L_r$ = 6.86 µH |
| Magnetizing inductance | $L_M$ = 48 µH |
| Operating frequency range | $f_s \in$ [445, 800] kHz |
| Gain variation | $M \in$ [1.13, 3.07] |

It should be noted that the magnetizing inductance value in this table corresponds to the net primary-referred magnetizing inductance in FIG. 13.

A conventional LLC design procedure requires that the load resistance, $R_L$, be reflected through the output rectifier and across the transformer to synthesize an effective load resistance in parallel with the primary-side magnetizing branch.

Although the VIRT structure uses multiple rectifiers, a similar method can be employed as in the conventional configuration to synthesize the effective load resistance.

In a conventional LLC design with a single full-bridge rectifier connected to the secondary of an $N_p$:$N_s$ transformer, the load resistance $R_L$ is mapped to the primary-side magnetizing branch as $$R_{e,FB} = \frac{8}{\pi^2}\left(\frac{N_p}{N_s}\right)^2 R_L$$

In the case of operating the VIRT in FB/FB mode, the same equation applies except that $N_s$=0.5, yielding, $$R_{e,FB/FB} = \frac{32}{\pi^2} N_p^2 R_L$$

This result is consistent with the expectation that the VIRT in FB/FB mode should be functionally equivalent to a $2N_p$:1 transformer. The effective load resistance in the remaining cases can be similarly computed and their values are listed in Table 6.

TABLE 6

| VIRT mode | Effective load resistance |
| --- | --- |
| FB/FB | $R_e = \frac{32}{\pi^2} N_p^2 R_L$ |
| HB/HB | $R_e = \frac{8}{\pi^2} N_p^2 R_L$ |
| FB/0 | $R_e = \frac{8}{\pi^2} N_p^2 R_L$ |
| HB/0 | $R_e = \frac{2}{\pi^2} N_p^2 R_L$ |

It should be noted that when the FB/0 or HB/0 modes are employed, the effective load resistance matches that of a conventional LLC employing a full- or half-wave rectifier, respectively, with an $N_p$:1 transformer.

As discussed above, the VIRT technique may be particularly valuable in planar transformers with large turns ratios and in cases where the copper loss of the transformer is high. The implementation of the transformer (i.e. the choice of employing a fully planar design, choosing the number of layers, interleaving the windings, etc.) is therefore significant in determining the benefit of applying the VIRT technique.

Figure 15:
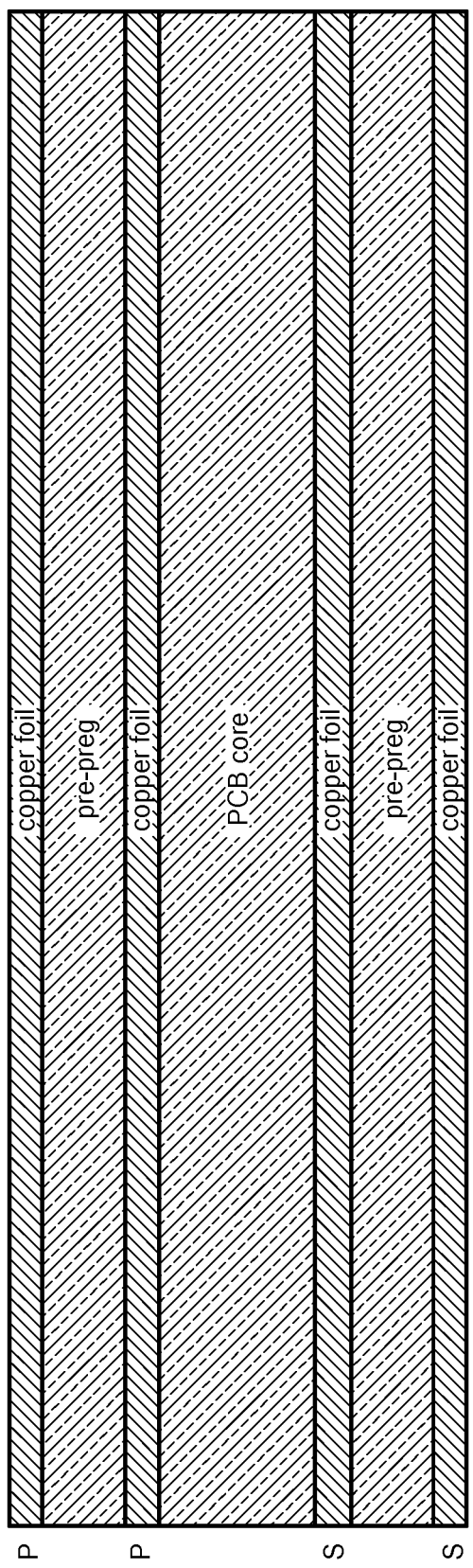
FIG. 15 is an example transformer layer stack-up of the LLC+VIRT converter of FIG. 13, with primary (P) and secondary (S) layers indicated.
Figure 16:
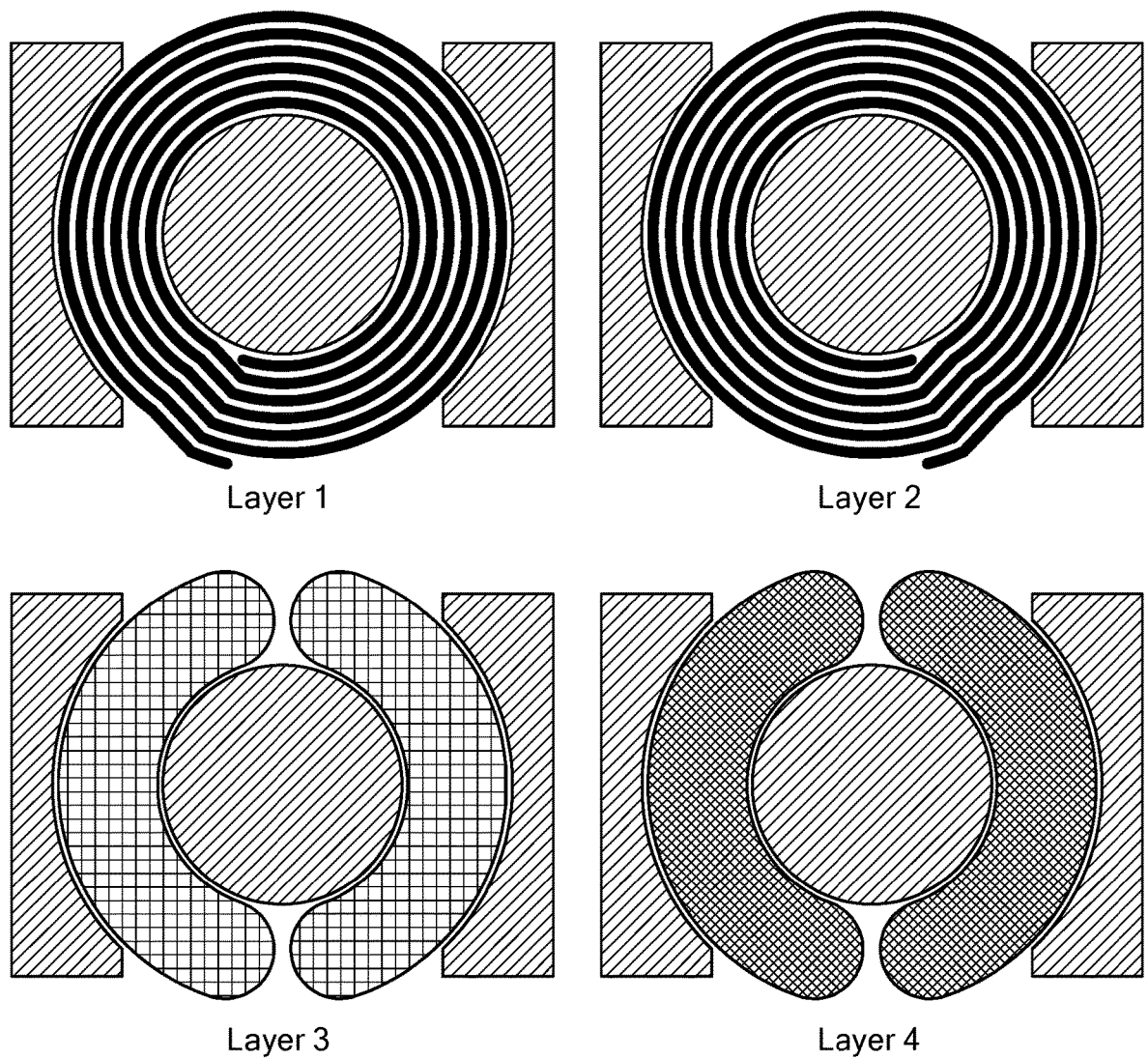
FIG. 16 is a series of diagrams corresponding to a series of layers of an illustrative transformer winding arrangement of an LLC+VIRT converter having a 12:0.5 turns ratio.

Referring now to FIGS. 15 and 16, an example design employs a fully planar transformer built on a two-ounce copper, four-layer, 0.062" PCB with an EQ20/PLT+3F36 core. It should be appreciated, of course, that in other embodiments, it may be desirable or even necessary to utilize PCB's having structural and electrical characteristics different from that described in this example (e.g. different number of layers, different PCB thickness, relative permittivity, etc.).

It should be appreciated that FIG. 16 illustrates the layers of an illustrative transformer winding arrangement corresponding to an LLC+VIRT converter having a 12:0.5 turns ratio and which may be the same as or similar to the LLC+VIRT converter described in conjunction with FIG. 13. The primary turns are connected in series across layers 1 and 2 while the secondary half-turns are wound in parallel between layers 3 and 4. Instead of directly paralleling the secondary windings, it would also be possible to provide each secondary layer with its own rectifier set (not shown);

In this example, the windings are layered in a non-interleaved manner as shown in FIG. 15 and are wound as shown in FIG. 16. In other embodiments, it may be desirable or even necessary to utilize interleaving. In this illustrative embodiment, the primary winding comprises six (6) turns on layer one (1) in series with six (6) turns on layer two (2) while the secondary winding comprises two sets of half-turns wound in parallel on the secondary layers. In other embodiments, a different number of turns may be used, for example, to suit the needs of a particular application.

A voltage isolation requirement of 2.5 kV is typical for converters used in universal ac chargers. To meet this requirement, greater than 0.017" of FR4 is required between the primary and secondary windings of the transformer. A 0.062", two-ounce, four-layer board has a typical core thickness of 0.028" and is therefore suitable to meet the isolation requirement in this design. Note that if interleaving is employed with this 0.062" board (i.e. the layer stack-up is changed to P-S-P-S in FIG. 15), the pre-preg layers in FIG. 15 would form the insulating layers between primary and secondary. In this case, the thickness of the insulating layer is only 0.011" and is therefore unsuitable for meeting the voltage isolation requirement unless suitable high-strength insulation materials are used in the PCB.

Thus, rather than turning to an interleaved design to reduce copper loss and having to increase the layer thicknesses of the PCB as a result, the VIRT technique offers a separate means for reducing this loss component and can therefore enable minimization of the cost and size of the PCB.

Other methods of decreasing the copper loss of the transformer, such as increasing the number of layers or increasing the copper thickness, also come at the cost of a more exotic and expensive PCB. In cases where copper loss can be favorably traded-off for core loss by employing the VIRT technique, improved efficiency is achieved without having to suffer these additional costs (it is recognized that these techniques can also be combined with VIRT).

There are many additional possibilities for forming the required isolation barrier. For example, instead of one thick PCB core layer in the transformer winding stack-up, two thin core layers can be employed where each is capable of isolating against the required voltage, or three thinner core layers can be used where any two together can isolate the required voltage. Alternatively, a thinner PCB core layer that employs a higher-voltage dielectric material can be used. This provides flexibility for achieving the isolation barrier in a fully-planar magnetic design.

Hybrid transformer designs are also possible. For example, the primary winding can be wire wound (e.g. with Litz wire) while the secondary winding is planar. In this case, wire insulation, the circuit board and/or an additional spacer could be used to provide the isolation barrier.

Conversely, series-connected Y-capacitors can be employed to provide all or part of the isolation requirement, removing the isolation constraint from the transformer and allowing thinner transformer layers.

Because the VIRT technique locates the rectifiers on opposite sides of the transformer, it is possible for the primary and secondary-side components to occupy the same side of the board. It is important in this situation that the layout respects the voltage isolation requirement between primary and secondary.

Figure 17A:
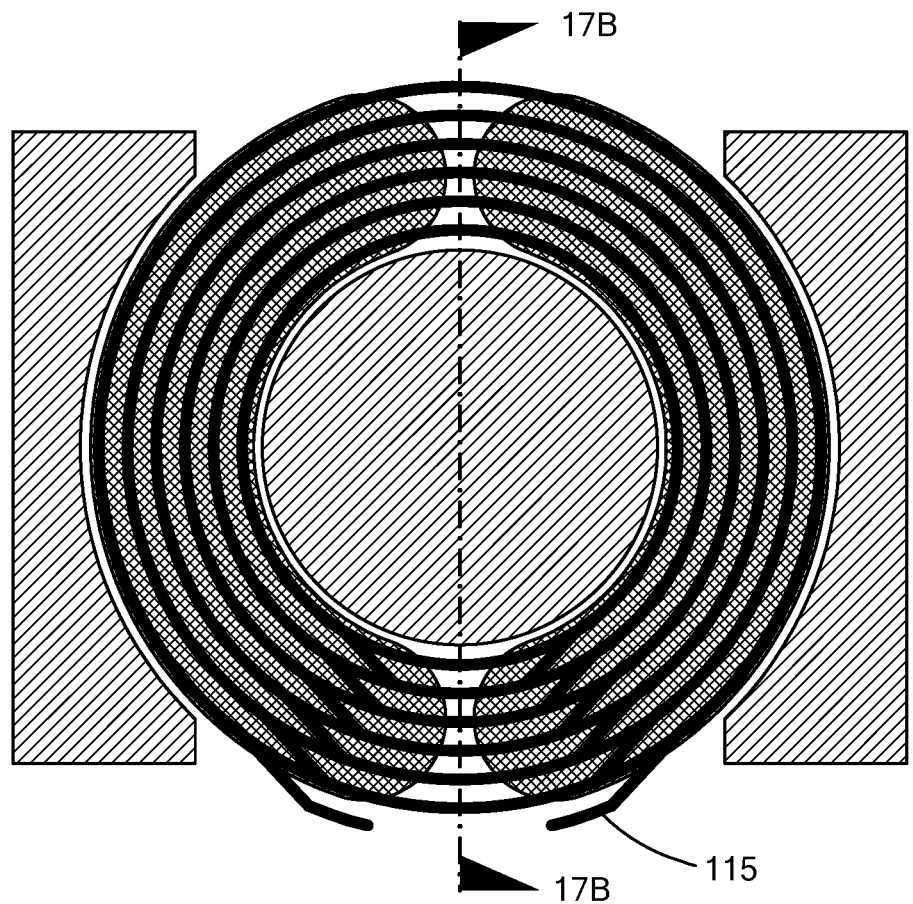
FIG. 17A is a top view of an illustrative converter having transformer windings which illustrate an implementation of the winding pattern shown in FIG. 16.
Figure 17B:
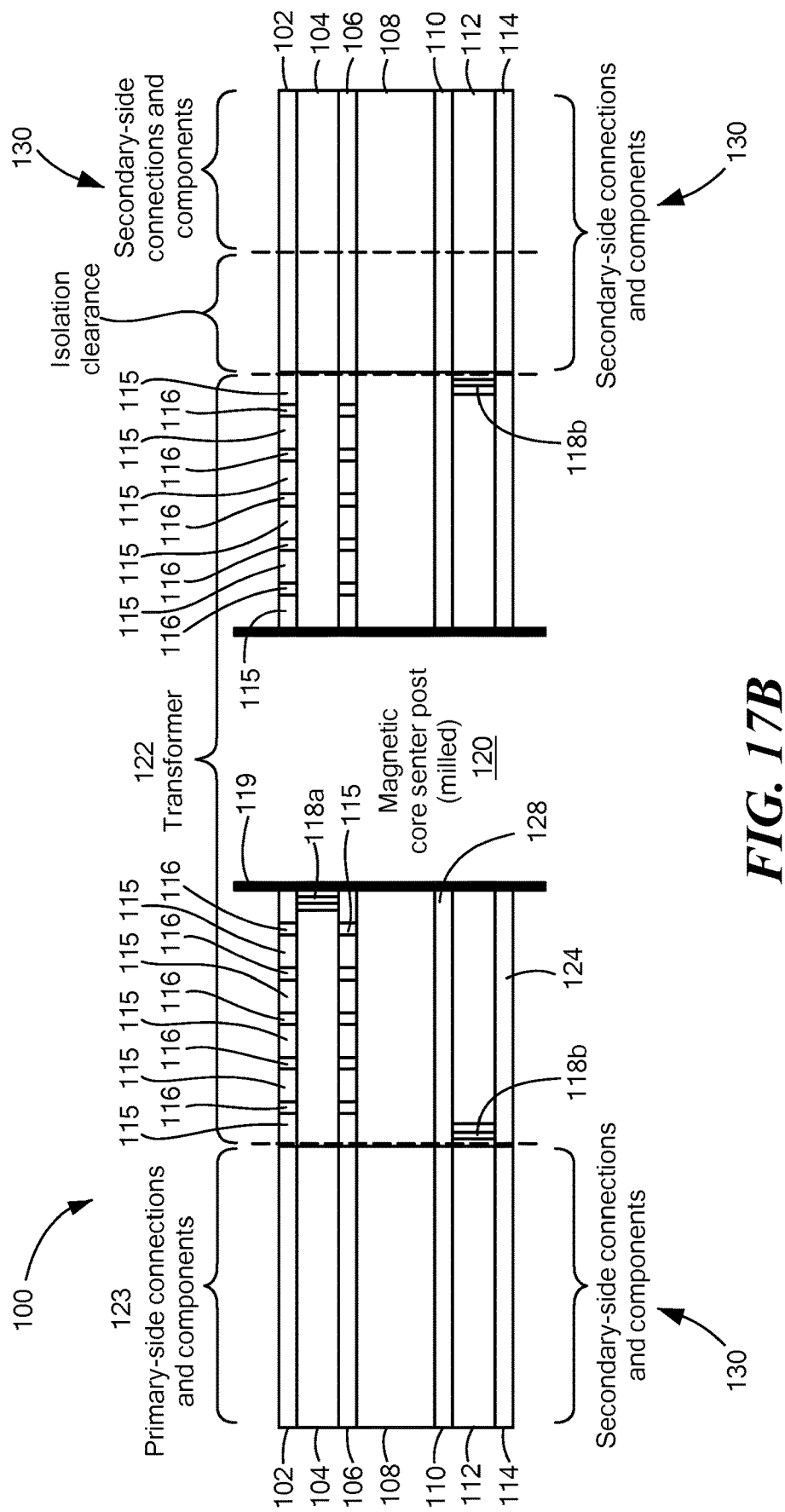
FIG. 17B is a cross-sectional view of the converter of FIG. 17A taken across lines 17B-17B shown on FIG. 17A.
Figure 18A:
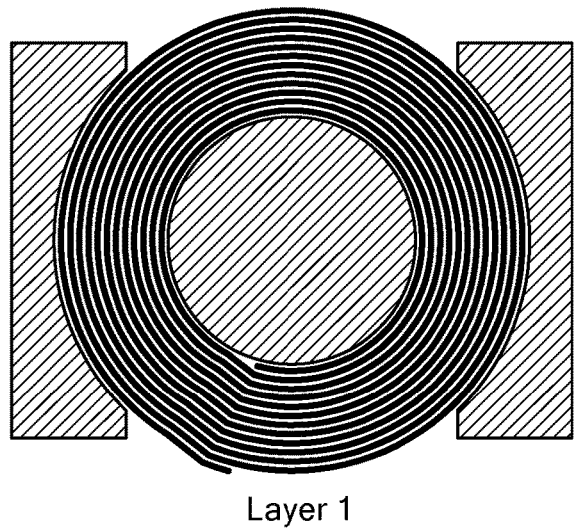
FIGS. 18A-18D are a series of diagrams corresponding to a series of layers of an illustrative transformer winding arrangement of an LLC converter having a conventional 24:1 transformer.
Figure 18B:
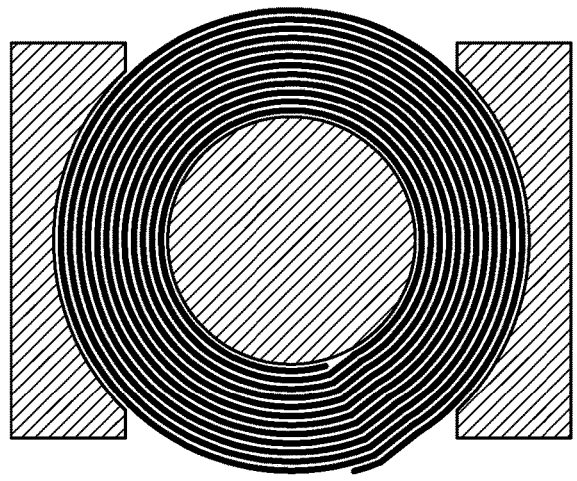
Figure 18C:
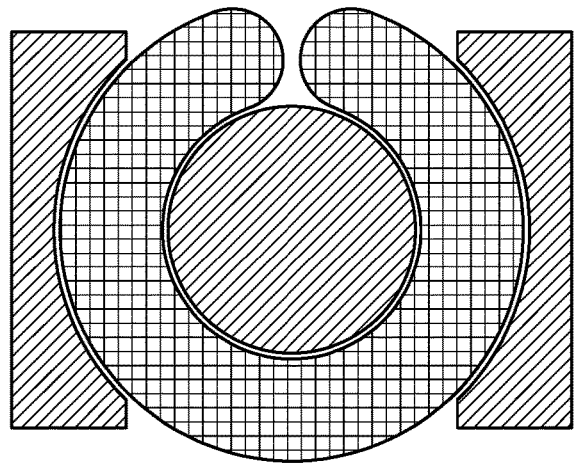
Figure 18D:
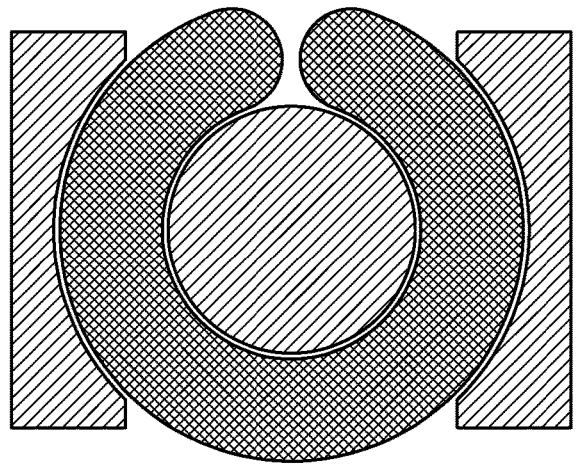

For example and referring now to FIGS. 17A and 17B in which like elements are provided having like reference designations, a converter 100 converter having transformer windings includes a printed circuit board (PCB) core 108 having a conductor (e.g. copper foil) 106, 108 disposed over first and second surfaces thereof. A reinforcing fabric which has been pre-impregnated with a resin system (and thus commonly referred to as a "pre-preg" material) 104 is disposed over conductor 106 and a conductor 102 is disposed over pre-preg 104. A second pre-preg material 112 is disposed over conductor 110 and a conductor 114 is disposed over pre-preg 112.

Primary traces 115 (e.g. wound primary traces) which may be provided, for example, using an etching technique to pattern conductor 102 are disposed over pre-preg 104. It should, however, be noted than either additive or subtractive techniques may be used to provide the traces. The traces are spaced apart as indicated by reference number 116. A via 118a (which may be a blind via) electrically couples the two layers of primary windings (i.e. on each side of layer 104) in series.

Reference numeral 119 simply demarcates an edge of a cut-out and thus is merely intended for clarity and is not properly a part of the converter 100. Reference numeral 120 identifies the space in which is disposed a center-post of a magnetic core.

The portion of the PCB being used for the transformer windings is identified with reference numeral 122 while reference numeral 123 identifies the portion of the PCB that can be used freely for other components in the circuit.

Secondary traces 124, 128 are disposed on opposing surfaces of pre-preg 112 and are electrically coupled by a second via 118b.

Reference numeral 130 indicates that secondary-side components should preferably be placed away from primary-side components (such as the primary turns) in order to respect isolation clearances.

Thus, the illustrative layout show in FIG. 17B includes secondary-side components and connections placed on the bottom two layers without issue since the PCB core provides insulation from the primary. However, secondary components and connections can also be placed on the top two layers as long as an isolation clearance from the primary windings is respected. For universal ac input voltages, a clearance requirement of 3 mm is typical.

Figure 2A:
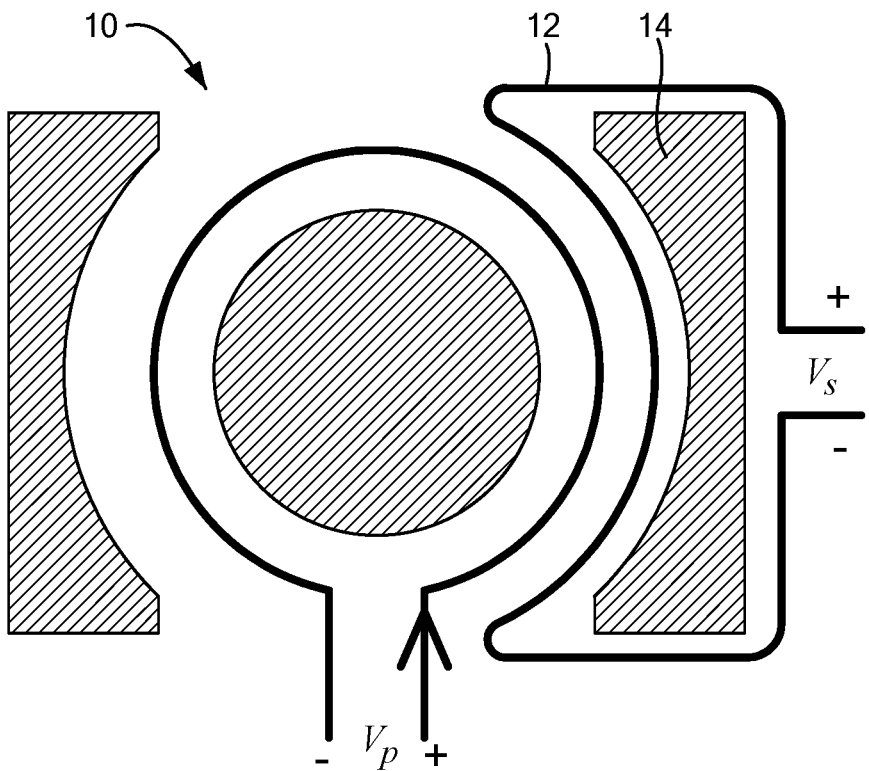
FIG. 2A is a diagram of a prior art transformer having a fractional turns ratio provided by having a single-turn secondary wound around a core-leg that carries only half of the primary-generated flux.
Figure 2B:
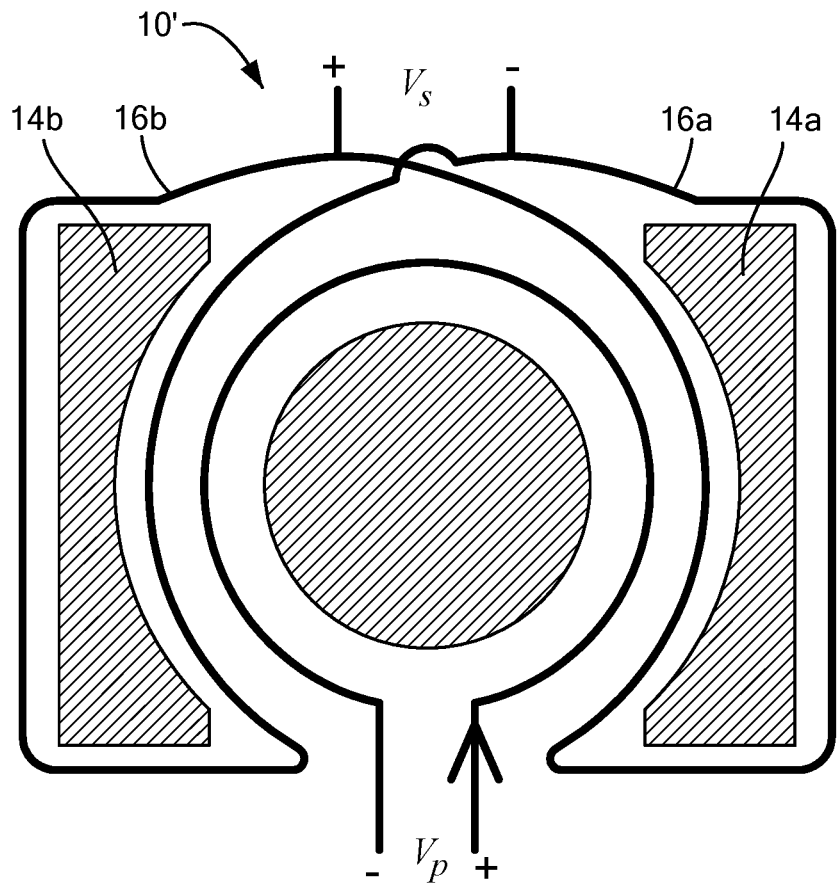
FIG. 2B is a diagram of an alternate embodiment of a prior art transformer having a fractional turns ratio provided by connecting two outer leg windings in parallel such that a secondary voltage Vs is induced by only half the primary-generated flux.
Figure 2C:
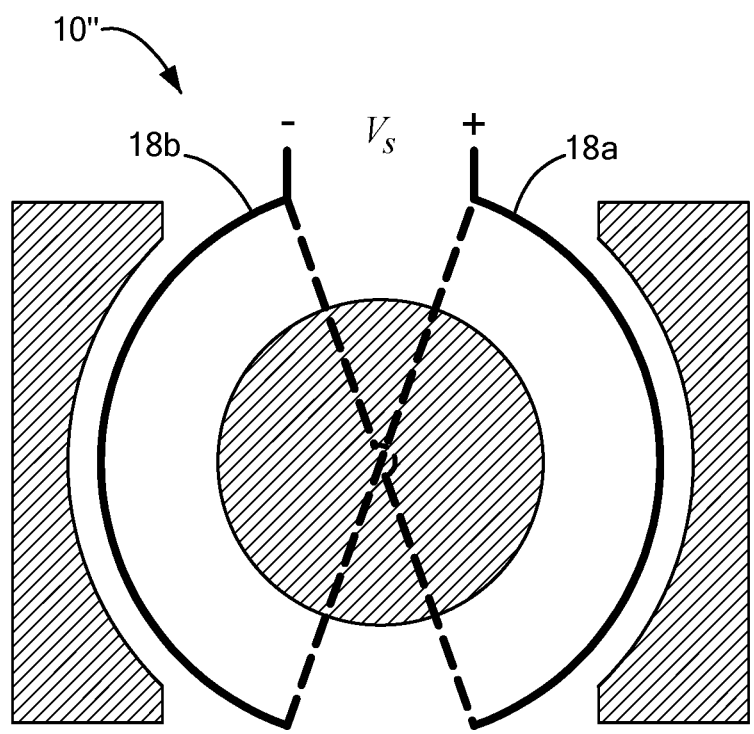
FIG. 2C is a diagram of an alternate embodiment of a prior art transformer having a fractional turns ratio provided by utilizing two half turns to achieve the same voltage coupling effect as in the embodiment of in FIG. 2B.

It should be noted that FIGS. 17A, 17B only serve to illustrate one possibility of how the voltage isolation requirement can be satisfied and should not be considered limiting. Thus, it is recognized that alternate techniques exist to satisfy voltage isolation requirements. For example, primary-side components could be placed on the board such that they are not directly over the secondary-side components (e.g. to the left and right of the magnetic structure in FIG. 2). Additionally, while FIG. 17 shows the connection of the planar windings using blind vias, it is also possible to use through-hole vias as long as the primary-side vias have the required clearance from the secondary-side traces/components (and vice-versa).

To assess the benefit of the VIRT technique in this application, a second LLC converter is considered with the same parameters and components as the VIRT converter except with a conventional 24:1 transformer and full-bridge rectifier instead of a 12:0.5 VIRT. The layer stack-up of the conventional transformer is identical to that shown in FIG. 15, and the windings are distributed as shown in FIGS. 18A-18D.

Thus, FIGS. 18A-18D are a series of diagrams corresponding to a series of layers (here four layers) of an illustrative transformer winding arrangement of an LLC converter having a conventional 24:1 transformer. The primary turns are connected in series between layers 1 and 2 while the single secondary turn is wound in parallel between layers 3 and 4.

It should be noted that for the same parameters as in Table 4, the two converters (i.e. the VIRT converter of FIG. 15 and the LLC converter having a conventional 24:1 transformer of FIGS. 18A-18D) are only expected to differ in their transformer losses.

To rapidly assess whether applying the VIRT technique has benefit in a given design, a rule-of-thumb check can be used. This check is derived by estimating the impact of halving the primary and secondary turns on the core and copper loss of a transformer.

Core loss can be approximated using the Steinmetz equation $$P_{core} = k f^{\alpha} B_{pk}^{\beta}$$

Where $B_{pk}$ is the peak flux-density. For a square-wave voltage, $B_{pk}$ can be expressed as:

$$B_{pk} = \frac{V_{pk}}{4 N f A_c}$$

in which:
$V_{pk}$ is the peak voltage applied to the primary-side;
N is the number of primary turns;
f is the switching frequency; and
$A_c$ is the cross-sectional area of the core.

When the VIRT technique is applied, the number of primary turns is halved while the remaining parameters are unchanged (Note that this assumes operation in the FB/FB or HB/HB mode—operation in the FB/0 or HB/0 mode halves the effective cross-sectional area of the core as discussed previously). In this case, $B_{pk}$ increases by a factor of two. The 3F36 material used in this design has $\beta$=2.72, thus $$P_{core} \rightarrow 2^{2.72} P_{core} = 6.6 P_{core}$$

The core loss increases by a factor of 6.6 when the VIRT technique is applied. This represents only an approximation of the impact on core loss since the Steinmetz equation assumes sinusoidal excitation, which an LLC operated below-resonance will not apply to the transformer. However, this remains a useful order-of-magnitude estimation on the increase in core loss.

Copper loss can be estimated as $$P_{cu} = R_{ac} I_{prim}^2$$

in which:
$R_{ac}$ is the primary-referred ac resistance of the transformer windings; and
$I_{prim}$ is the rms current through the primary.

The ac resistance is directly proportional to the dc resistance which, in a planar magnetic, is proportional to the square of the number of turns, N, $$R_{dc} \propto N^2$$

It should be noted that this relationship neglects the impact that additional turns have on the available window area. Specifically, the relationship assumes that when the number of turns is doubled, the width of the traces is halved. In practice, the trace-width is more-than-halved due to reduction of the window area, thus the resistance's proportionality to the number of turns will be super-quadratic. In the simplified case where the quadratic relationship holds, applying the VIRT technique yields $$P_{cu} \rightarrow \frac{1}{4} P_{cu}$$

The copper loss decreases by a factor of four when the VIRT technique is applied. Thus, the technique is beneficial when $$P_{core} + P_{cu} > 6.6 P_{core} + \frac{1}{4} P_{cu}$$

Simplifying, $$P_{cu} > 7.47 P_{core}$$

Thus, a rule-of-thumb condition where the VIRT technique is especially beneficial is when the copper loss is greater than approximately 7.5 times the core loss in a conventional transformer design.

The magnetic losses of the two converters are estimated by computing the core and copper losses of the conventional configuration and then mapping these losses onto the VIRT configuration using the relationships described above. There are twelve corners to the operating modes of the converter, resulting from the combination of the minimum and maximum input voltage, two inverter operating modes, and three possible output voltages. Losses are estimated at maximum power for each of these corners.

Copper loss may be estimated by calculating the (frequency dependent) ac winding resistance of the transformer for each operating corner using an M2SPICE tool and by computing the primary-side, magnetizing, and secondary-side currents using an LTSPICE simulation. Similarly, core losses are estimated by extracting the transformer flux density waveforms from the simulation (by integrating the voltage across the single secondary winding and dividing by the effective area of the core) and inputting these waveforms into the Improved General Steinmetz Equation model. Once these losses are computed, the magnetic losses of the VIRT configuration are estimated as $$P_{VIRT} = 6.6 P_{core} + \frac{1}{4} P_{cu}$$

in which $P_{core}$ and $P_{cu}$ are the computed losses for the conventional configuration.

Figure 19:
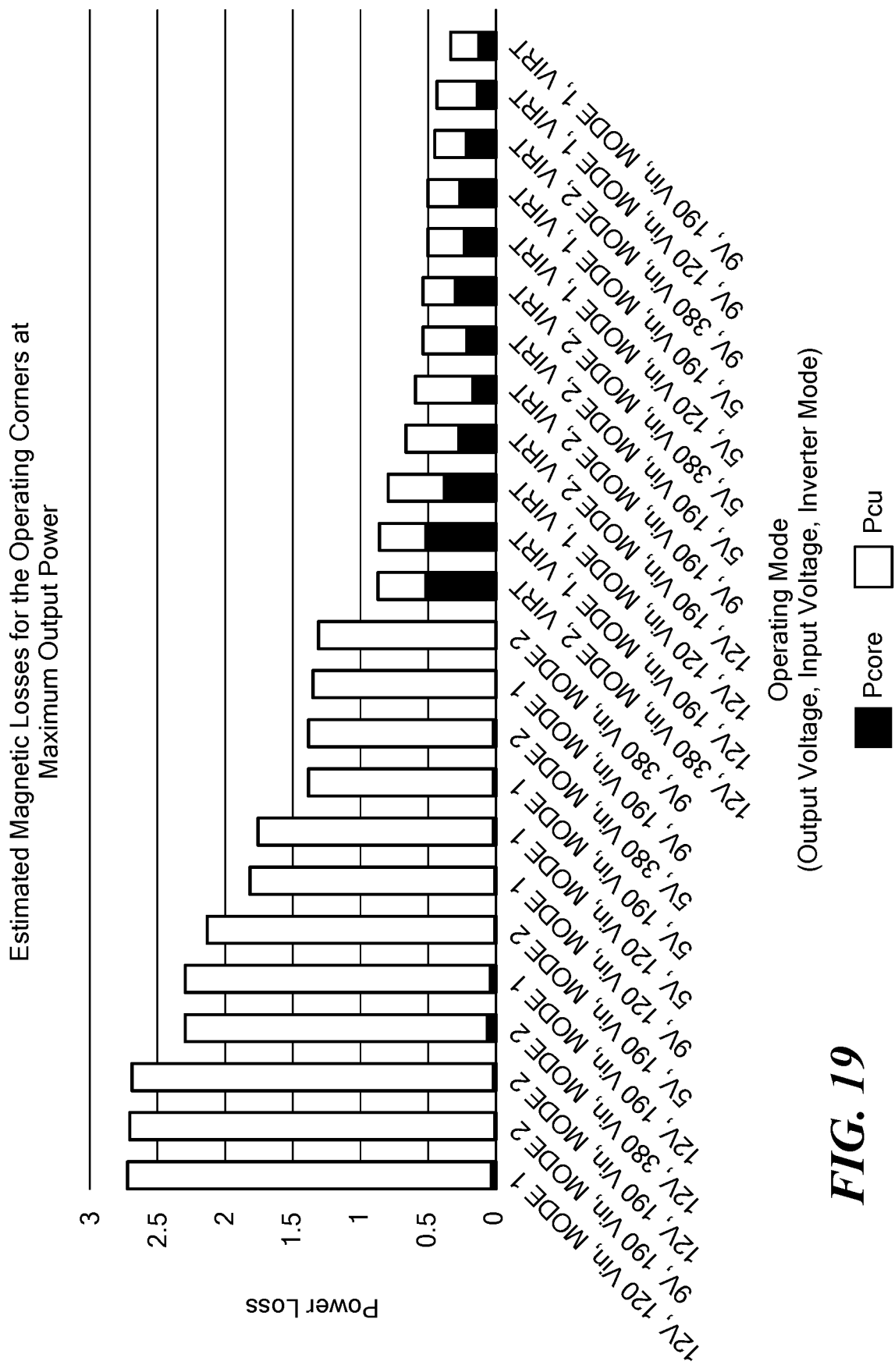
FIG. 19 is plot of power loss (estimated magnetic losses) vs. operating mode for twelve operating corners in an example VIRT and a conventional converter, arranged from maximum to minimum

Referring now to FIG. 19 a plot of power loss (estimated magnetic losses) vs. operating mode for twelve operating corners in an example VIRT and a conventional converter, arranged from maximum to minimum is shown. As can be seen from FIG. 19, the conventional configuration has a strong imbalance between core and copper losses, while the VIRT configuration better balances these losses and in turn offers lower overall loss. Thus, these results suggest that the VIRT configuration offers much better balance of the magnetic loss components and in turn offers lower overall magnetic loss.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

All publications and references cited herein are expressly incorporated herein by reference in their entirety.

What is claimed is:

1. A transformer/rectifier structure comprising:
   a magnetic core having a center post;
   a plurality of primary turns wound around said center post; and
   two or more rectifiers distributed around the magnetic core and connected through two or more fractional turns forming a secondary winding on said center post.

2. The transformer/rectifier structure of claim 1 wherein said fractional turns comprise two half turns.

3. The transformer/rectifier structure of claim 1 wherein said fractional turns comprise four quarter turns.

4. The transformer/rectifier structure of claim 1 wherein said two or more rectifiers comprise full-bridge rectifiers.

5. The transformer/rectifier structure of claim 4 wherein the full-bridge rectifiers comprise half-bridge cells that are connected to an output bus.

6. The transformer/rectifier structure of claim 1 wherein said fractional turns are routed as traces on a printed circuit board (PCB).

7. A transformer/switching cell structure comprising:
   a magnetic core having at least two magnetic core posts;
   a plurality of primary turns wound around at least one of said magnetic core posts; and
   two or more switching cells distributed around the magnetic core and connected through two or more fractional turns forming at least one secondary winding on at least one of said magnetic core posts.

8. The transformer/switching cell structure of claim 7 wherein said two or more switching cells comprise full-bridge inverters.

9. The transformer/switching cell structure of claim 7 wherein said two or more switching cells comprise full-bridge rectifiers.

10. The transformer/switching cell structure of claim 7 wherein said two or more switching cells comprise half-bridge inverters.

11. The transformer/switching cell structure of claim 7 wherein said two or more switching cells comprise half-bridge rectifiers.

12. The transformer/switching cell structure of claim 7 wherein said fractional turns are routed as traces on a printed circuit board.

13. The transformer/switching cell structure of claim 7 wherein all said primary and fractional turns are routed as traces on a printed circuit board (PCB).

* * * * *